US010927585B2

(12) United States Patent
McGettrick et al.

(10) Patent No.: US 10,927,585 B2
(45) Date of Patent: Feb. 23, 2021

(54) SYSTEM FOR ELECTRONIC CONTROL UNIT WAKE-UP ON MOVEMENT OF A CONTROLLED MEMBER AND PROTECTION FROM MOTOR BACK ELECTROMOTIVE FORCE

(71) Applicant: MAGNA CLOSURES INC., Newmarket (CA)

(72) Inventors: Thomas McGettrick, Plymouth, MI (US); Xu Yang Zhang, Northville, MI (US)

(73) Assignee: MAGNA CLOSURES INC., Newmarket (CA)

( * ) Notice: Subject to any disclaimer, the term of this patent is extended or adjusted under 35 U.S.C. 154(b) by 198 days.

(21) Appl. No.: 16/037,040

(22) Filed: Jul. 17, 2018

(65) Prior Publication Data

US 2019/0017311 A1 Jan. 17, 2019

Related U.S. Application Data

(60) Provisional application No. 62/533,214, filed on Jul. 17, 2017.

(51) Int. Cl.
*E05F 15/60* (2015.01)
*E05F 15/603* (2015.01)
(Continued)

(52) U.S. Cl.
CPC .............. *E05F 15/603* (2015.01); *B60Q 9/00* (2013.01); *E05F 15/41* (2015.01); *E05F 15/622* (2015.01); *E05F 15/697* (2015.01);
*E05F 15/70* (2015.01); *H02P 3/12* (2013.01); *H02P 7/29* (2013.01); *B60J 1/17* (2013.01); *B60J 5/06* (2013.01);
(Continued)

(58) Field of Classification Search
CPC ......... E05F 15/603; E05F 15/41; E05F 15/70; E05F 15/622; E05F 15/697; B60Q 9/00; H02P 3/12; H02P 7/29; B60J 1/17; B60J 5/06; B60J 5/10; E05Y 2900/531;
(Continued)

(56) References Cited

U.S. PATENT DOCUMENTS 4,097,864 A * 6/1978 Endo .................. G01S 13/60
342/109
4,962,337 A * 10/1990 Creed .................. H02P 7/05
318/266
(Continued)

*Primary Examiner* — Mary Cheung
(74) *Attorney, Agent, or Firm* — Dickinson Wright PLLC

(57) ABSTRACT

A system for waking an electronic control unit upon movement of a controlled member, such as a vehicle lift gate or window, and protecting the electronic control unit from motor back EMF are provided. The system includes a power drive unit coupled to the controlled member and to the electronic control unit for moving the controlled member. A comparator subsystem is coupled to the power drive unit and is configured to compare an electrical output of the power drive unit generated due to motor back electromotive force in response to a manual movement of the controlled member to an electrical reference to determine whether to wake the electronic control unit. The system detects manual movement of the controlled member, e.g. from unauthorized entry, and causes an alarm and/or for the motor to brake or to drive to counteract the manual movement of the controlled member.

20 Claims, 18 Drawing Sheets

(51) Int. Cl.
  *E05F 15/41* (2015.01)
  *E05F 15/70* (2015.01)
  *E05F 15/622* (2015.01)
  *E05F 15/697* (2015.01)
  *B60Q 9/00* (2006.01)
  *H02P 3/12* (2006.01)
  *H02P 7/29* (2016.01)
  *B60J 1/17* (2006.01)
  *B60J 5/06* (2006.01)
  *B60J 5/10* (2006.01)

(52) U.S. Cl.
  CPC ............ *B60J 5/10* (2013.01); *E05Y 2900/531* (2013.01); *E05Y 2900/546* (2013.01); *E05Y 2900/55* (2013.01)

(58) Field of Classification Search
  CPC ........... E05Y 2900/546; E05Y 2900/55; B60R 16/02; G06F 9/4418
  See application file for complete search history.

(56) References Cited

U.S. PATENT DOCUMENTS

| | | | |
|---|---|---|---|
| 6,404,157 B1* | 6/2002 | Simon | G05B 15/02 318/445 |
| 2002/0101210 A1* | 8/2002 | Boisvert | B60J 7/0573 318/469 |
| 2010/0037523 A1* | 2/2010 | Oirsouw | E05F 15/70 49/32 |
| 2014/0350795 A1* | 11/2014 | Amin | B62D 15/021 701/42 |
| 2015/0007500 A1 | 1/2015 | Schatz et al. | |
| 2015/0376929 A1* | 12/2015 | Scheuring | F16D 41/064 74/89.38 |
| 2016/0144694 A1 | 5/2016 | Shchokin et al. | |
| 2016/0312514 A1 | 10/2016 | Leonard et al. | |
| 2017/0089115 A1 | 3/2017 | Wang et al. | |
| 2018/0100331 A1 | 4/2018 | Cumbo | |

* cited by examiner

SYSTEM FOR ELECTRONIC CONTROL UNIT WAKE-UP ON MOVEMENT OF A CONTROLLED MEMBER AND PROTECTION FROM MOTOR BACK ELECTROMOTIVE FORCE

CROSS-REFERENCE TO RELATED APPLICATIONS

This application claims the benefit of U.S. Provisional Application No. 62/533,214, filed on Jul. 17, 2017. The entire disclosure of the above application is incorporated herein by reference.

FIELD

The present disclosure relates generally to a system used with an electronic control unit for motor vehicles. More specifically, the present disclosure relates to a system for waking an electronic control unit upon movement of a controlled member and including algorithms protecting the electronic control unit from motor back electromotive force.

BACKGROUND

This section provides background information related to the present disclosure, which is not necessarily prior art.

Vehicles typically include a number of electronic control units to control various aspects of vehicle operation. One example of such electronic control units is an electronic control unit (ECU) for a closure member such as a power lift gate/tailgate, a window, a siding closure such as a sliding door or sunroof, or other controlled member (e.g., a power seat). Original Equipment Manufacturers (OEMs) of vehicles are continually searching for opportunities to reduce the vehicle "off" (i.e., sleep) currents drawn from a vehicle battery when the vehicle is off. This applies to vehicles having manual closure members and power controlled members, such as tailgates or lift gates. The "gate open" condition has been addressed by OEMs for manual tailgates, but is unresolved for power lift gates or tailgates.

For vehicles with manual tailgates, the main source of sleep current for the vehicle tailgate open condition is the over-head lamp located at the rear of the passenger compartment or on the tailgate itself. This is illuminated when the lift gate is open, but is subsequently timed-out by the other electronic control units, such as a body control module (BCM), after a specified duration (typically 15 minutes) to conserve energy and avoid depletion of the vehicle main battery. The lamp(s) remain off until the tailgate is closed and re-opened.

For vehicles with power operated tailgates, the main source of sleep current for the open tailgate is the sensor current of a sensor and supporting sensor electronics required to detect manual movement of the tailgate for ECU wake-up for proper latch cinching, powered gate movement, and gate position monitoring. The sensor current is significant enough to drain the vehicle battery's energy over long periods of time (for example during "tailgating" sporting events whereby the lift gate is left open for access to the internal cabin). However, if the sensor is deactivated after a time period to conserve battery energy (similar to the deactivation of the lamp(s) for the manual tailgate) then the gate position is lost (required for mid-travel powered operations) and the ECU is not awake to monitor quick-transition latch signals for closure (required to properly cinch and transition the latch from a secondary latched position to a primary latched position).

ECUs used to operate power tailgates typically use metal-oxide-semiconductor field-effect transistors (MOSFETs) to control tailgate drive unit motors. When an operator manually moves a tailgate, the tailgate back drives the motor, and the motor generates voltage (back-EMF). The voltage propagates through the MOSFET's body diode and onwards to other sensitive circuits of the ECU. Eventually, the back-EMF generated by the motor is fed to the vehicle battery wire harness coupled to the ECU and motor. If the operator pushes the tailgate very fast, the motor generates very high back-EMF voltage (in some cases, it can be higher than 100 volts). The high voltage may last for several seconds, depending on how long the operator manually operates the tailgate. If a battery is connected to the vehicle battery wire harness, the back-EMF on the wire harness is clamped at battery voltage. However, if no battery is connected to the wire harness or if the battery has been drained for example as a result of tailgating, the high back-EMF voltage on the battery wire harness cannot be limited by the vehicle battery and thus can damage ECUs connected to the battery wire harness.

On some ECU designs, a relay is installed between the MOSFET outputs and the motor's terminals. When the ECU turns off the motor, ECU turns off the relay and the MOSFET. As a result, the relay becomes an open circuit. Meanwhile, if an operator pushes the tailgate, the voltage generated by the motor is not able to go through the relay (open circuit). This design can protect ECUs from being damaged by the back-EMF. However, an extra relay and relay control is needed. Also, if the operator slams the tailgate very hard, some mechanical parts can be damaged by the tremendous impact force.

In addition, there are other hardware solutions to protect ECUs from being damaged by the back-EMF. Most of these designs need extra hardware components to protect the ECUs from high voltage surges, which can last for several seconds. These extra hardware components can add a substantial cost to the ECUs.

In view of the above, a need exists in the art to design and develop systems for electronic control units capable of wake-up on movement of a controlled member and protection from motor back electromotive force.

SUMMARY

This section provides a general summary of the disclosure and is not intended to act as a comprehensive and exhaustive disclosure of its full scope or all of its features, advantages, objectives and aspects.

It is an objective of the present disclosure to provide a system for waking an electronic control unit upon movement of a controlled member and protecting the electronic control unit from motor back electromotive force meets the above-identified needs and provides a technological advancement over conventional systems.

It is another objective of the present disclosure to provide a system for waking an electronic control unit upon movement of a controlled member, such as a power lift gate/tailgate, a window, or a siding closure such as a sliding door or sunroof. The system includes a power drive unit coupled to the controlled member and to the electronic control unit for moving the controlled member. A comparator subsystem is coupled to the power drive unit and is configured to compare an electrical output of the power drive unit generated due to motor back electromotive force in response to a manual movement of the controlled member to an electrical reference. The comparator subsystem is also configured to wake the electronic control unit based on the comparison of the electrical output of the power drive unit to the electrical reference.

It is another objective of the present disclosure to provide a system for protecting an electronic control unit from motor back electromotive force. The system includes a power drive unit coupled to a controlled member and to the electronic control unit for moving the controlled member. The electronic control unit is adapted to wake up using an electrical output of the power drive unit generated in response to a manual movement of the controlled member. The electronic control unit is also adapted to selectively short the power drive unit to ground to dissipate the electrical output of the power drive unit generated in response to the manual movement of the controlled member.

It is another objective of the present disclosure to provide a system for waking an electronic control unit upon movement of a controlled member, using a comparator subsystem that includes a differential amplifier to compare the electrical output to the electrical reference such as a predetermined voltage.

It is another objective of the present disclosure to provide a system for waking an electronic control unit upon movement of a controlled member, and with an electronic control unit configured to measure a speed of the controlled member.

It is another objective of the present disclosure to provide a system for waking an electronic control unit, and where the electronic control unit is configured to cause the motor to apply a braking force opposing the manual movement of the controlled member.

It is another objective of the present disclosure to provide a system for waking an electronic control unit, and where the electronic control unit is configured to cause the motor to apply a braking force opposing the manual movement of the controlled member, and where the braking force is proportionate to the speed of the controlled member.

It is another objective of the present disclosure to provide a system for waking an electronic control unit, where the electronic control unit is configured to vary the amount of the braking force using pulse width modulation.

It is another objective of the present disclosure to provide a system for waking an electronic control unit, where the electronic control unit is configured to selectively short a power drive unit to ground to cause a motor to apply the braking force opposing the manual movement of the controlled member.

It is another objective of the present disclosure to provide a system for waking an electronic control unit, where the electronic control unit is configured to selectively connect a resistive element to one or more motor terminals of the motor to cause the motor to apply the braking force opposing the manual movement of the controlled member.

It is another objective of the present disclosure to provide a system for waking an electronic control unit, where the electronic control unit is configured to selectively connect the resistive element between two or more of the motor terminals of the motor to cause the motor to apply the braking force opposing the manual movement of the controlled member.

It is another objective of the present disclosure to provide a system for waking an electronic control unit, where the electronic control unit is configured to selectively connect an electrical power supply to the motor to apply the braking force opposing the manual movement of the controlled member.

It is another objective of the present disclosure to provide a system for waking an electronic control unit, with a power drive unit including a gearset configured to provide a speed reduction between an output shaft of the motor and a driven shaft coupled to move the controlled member.

It is another objective of the present disclosure to provide a system configured to generate an alarm signal in response to the manual movement of the controlled member.

It is another objective of the present disclosure to provide a system having anti-theft functionality. The system includes a motor mechanically coupled to a window and in electrical communication with the electronic control unit for moving the window and producing a back electromotive force on an electrical output in response to the manual movement of a window. The system also includes a comparator subsystem electrically coupled to the motor and configured to compare the electrical output to an electrical reference, and to cause the motor to apply a force to the window in opposition to the manual movement of the window and in response to the comparison of the electrical output to the electrical reference. In accordance with an aspect of the present disclosure, the electrical control unit applies a voltage to the motor to cause the motor to apply the force to the window in opposition to the manual movement of the window.

Further areas of applicability will become apparent from the detailed description provided herein. As noted, the description of the objectives, aspects, features and specific embodiments disclosed in this summary are intended for purposes of illustration only and are not intended to limit the scope of the present disclosure.

DRAWINGS

The drawings described herein are for illustrative purposes only of selected embodiments and not all possible implementations and, as such, are not intended to limit the scope of the present disclosure.

Figure 17:
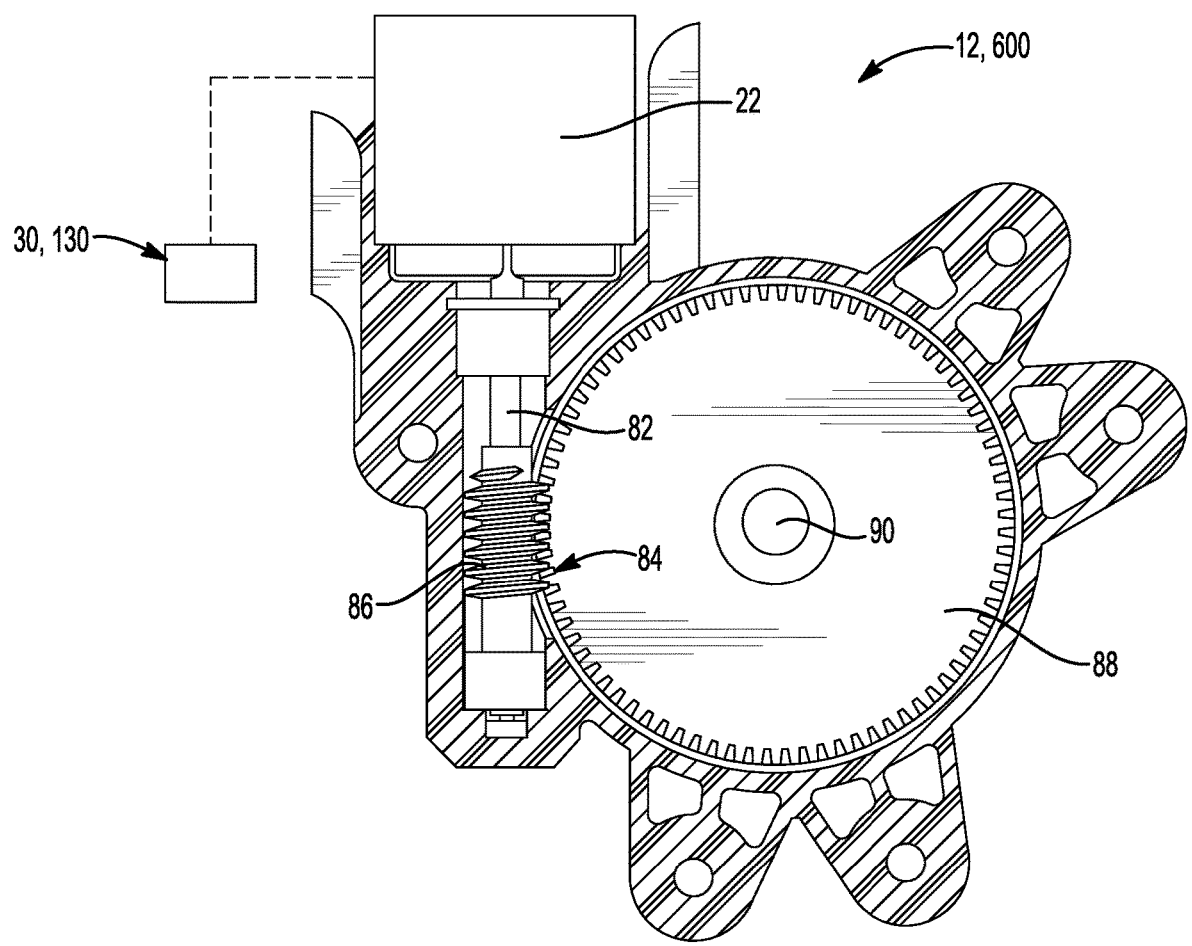
FIG. 17 illustrates a cut-away view of a power drive unit for a window regulator including a gearset, in accordance with an aspects of the disclosure.

FIG. 18A illustrates a dry side of a door panel showing power drive unit of FIG. 17 incorporated in a window regulator system, in accordance with an aspects of the disclosure; FIG. 18B illustrates a wet side of a door panel showing power drive unit of FIG. 17 incorporated in a window regulator system, in accordance with an aspects of the disclosure; and FIG. 19 is a flow chart of method steps illustrating an anti-theft aspect in accordance with an aspects of the disclosure.

Corresponding reference numerals indicate corresponding components throughout the several views of the drawings.

DETAILED DESCRIPTION

Example embodiments will now be more fully described with reference to the accompanying drawings. However, the following description is merely exemplary in nature and is not intended to limit the present disclosure, its subject matter, applications or uses. To this end, example embodiments of a system and method for waking an electronic control unit upon movement of a controlled member and protecting the electronic control unit from motor back electromotive force are provided so that this disclosure will be thorough and will fully convey the scope to those skilled in this art. Numerous specific details are set forth, such as examples of specific components, devices and methods to provide a thorough understanding of the embodiments in many different forms, and such should not be construed to limit the intended scope of protection afforded by this disclosure. As is understood, some well-known processes, structures and technologies are not described in detail herein in view of the understanding afforded thereto by those skilled in this art.

In general, the present disclosure relates to a system and method used with an electronic control unit for motor vehicles. More particularly, the present disclosure relates to a system for electronic control unit wake-up on movement of a controlled member and protection from motor back electromotive force and, more particularly, to a system and method of the type applicable and well-suited for use and installation in motor vehicles for waking the electronic control unit upon movement of a controlled member and protecting the electronic control unit from motor back electromotive force. However, the teachings provided herein are considered to be adaptable to any other electronic control unit required to control a motor and/or power drive unit that may be required to wake from a sleep, inactive or unpowered state upon movement of the motor or power drive unit, for example such as the movement of a garage door operatively connected to a garage door power driver unit. While the systems and methods of the present disclosure is disclosed in association with a tailgate or power lift gate, it is anticipated and contemplated that the system disclosed herein is applicable to other motor vehicle systems.

The controlled member may be, for example, a lift gate, tail gate, sliding closure, or a window of a vehicle. Such a window may be, for example, one that slides up and down into a door of a vehicle or one that is configured to be moved by pivoting about a vertical or horizontal axis, or by sliding such as a sunroof or a back window on a cab of a pickup truck. The controlled member may also be a garage door, or similar type sliding paneled door.

Figure 1:
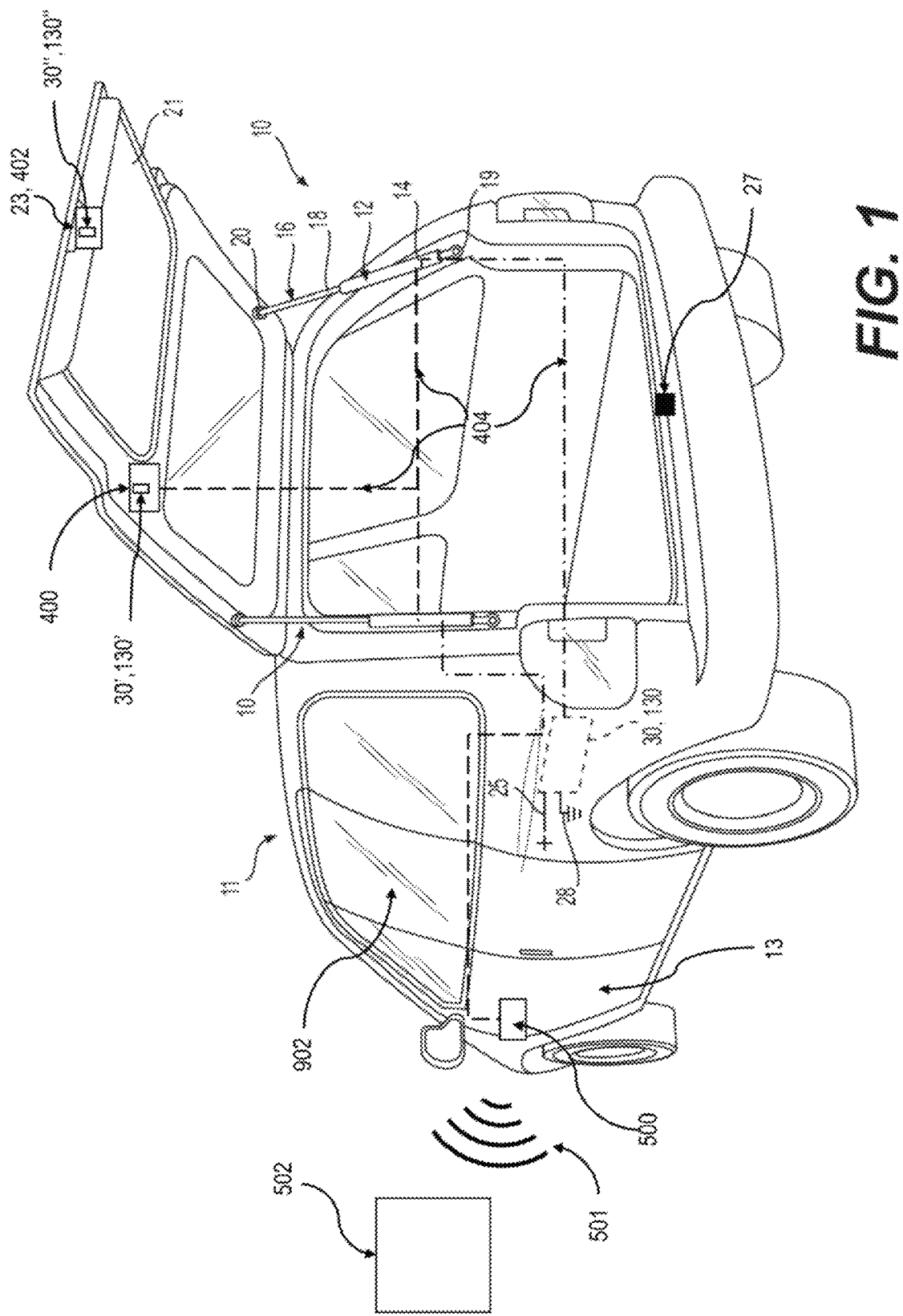
FIG. 1 is an isometric view of a motor vehicle having a powered lift gate equipped with a pair of electromechanical struts.

Referring now to FIG. 1, an electromechanical strut 10 is shown mounted to a motor vehicle 11. Electromechanical strut 10 includes a power drive unit 12 enveloped in an upper housing or tube, referred to hereafter simply as housing 14, and a telescoping unit 16, enveloped in an outer lower housing or cover tube, referred to hereafter as outer cover tube 18. A first pivot mount 19, located at an end of housing 14, is pivotally mounted to a portion of the body of the vehicle 11 that defines a portion of an interior cargo area in the vehicle 11. A second pivot mount 20 is attached to the distal end of telescoping unit 16 and is pivotally mounted to a controlled member or lift gate 21 of the vehicle 11. Power drive unit 12 of the electromechanical strut 10 illustratively includes an electric motor 22 (see FIG. 4 for example), such as a brushed or brushless DC motor, installed in a motor housing and a rotary-to-linear conversion device, such as a leadscrew and drive nut assembly as will be illustrated in more detail herein below, which may be installed in a strut housing 14 for example. The electric motor 22 includes a positive motor terminal 24 for supplying power to the motor 22 from vehicle voltage supply 25 (e.g., a battery) and a negative motor terminal 26 for grounding the motor 22 using a vehicle ground 28. The conversion device functions to convert rotation of a motor output of motor 22, into linear bi-directional movement of an extensible member housed in the strut housing 14.

Figure 2:
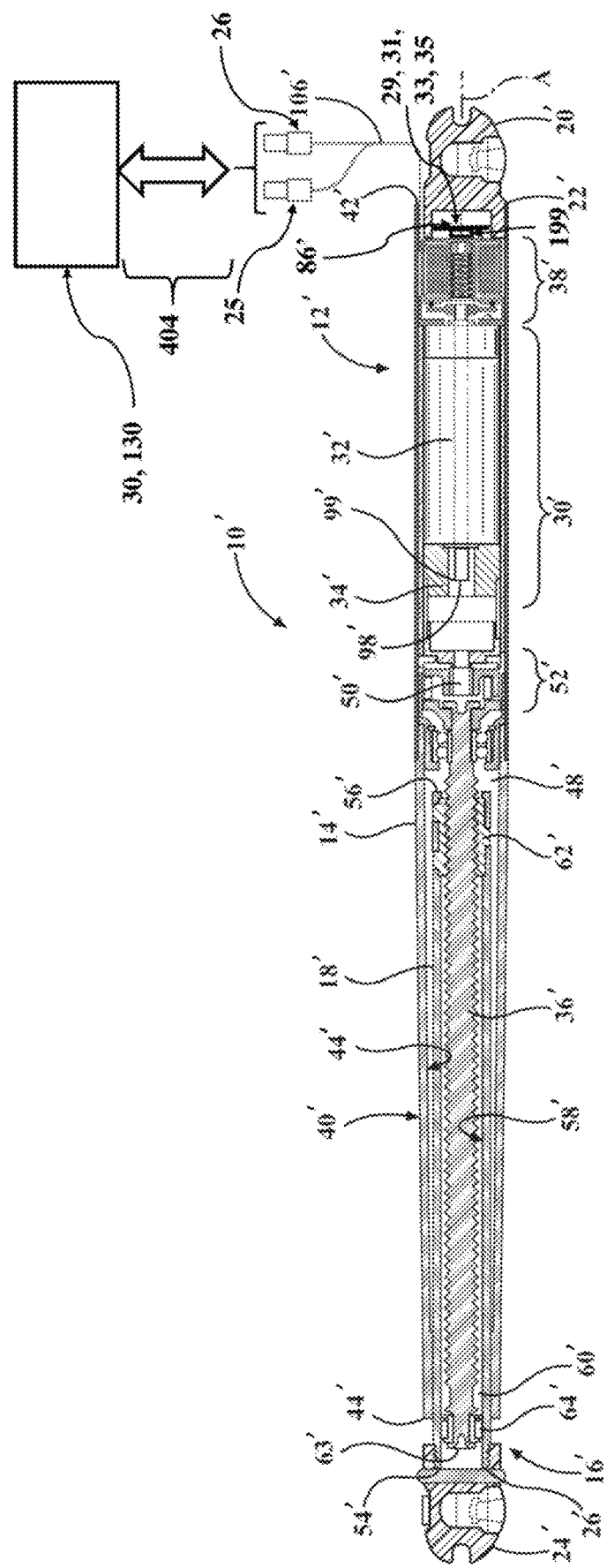
FIG. 2 is a cross-sectional view taken generally along a longitudinal central axis of the electromechanical strut of FIG. 1, in accordance with an illustrative embodiment.

Now referring to FIG. 2, in addition to FIG. 1, there is illustrated an embodiment of electromechanical strut 10, shown as the embodiment of electromechanical strut disclosed in commonly owned U.S. Publication No. US 2016/0312514 A1, filed Apr. 18, 2016, entitled "Electromechanical Strut With Electromechanical Brake And Method Of Allowing And Preventing Movement Of A Closure Member Of A Vehicle", which is incorporated herein by reference in its entirety. For illustration the electromechanical strut referenced therein using numeral 10, is reproduced for convenience in FIG. 2 with offset reference numeral 10'. Likewise, elements disclosed in U.S. Publication No. US 2016/0312514 A1 are shown in FIG. 2 as being offset by a prime ("'") symbol. In addition to electromechanical strut 10', the present disclosure may be applicable to other types of devices comprising a motor for moving a closure member, and reference to electromechanical strut 10' should not be limiting to the present disclosure. For example, the present disclosure may be applied to electromechanical struts disclosed in U.S. Publication No. US 2015/0376929 A1, filed Jun. 25, 2015 and entitled "Electromechanical Strut With Integrated Flex Coupling And Slip Device And Clutch/Coupling Assembly Therefor"; and U.S. Publication No. US 2016/0144694 A1, filed Nov. 11, 2015, and entitled "Electromechanical Strut With Motor-Gearbox Assembly Having Dual Stage Planetary Gearbox"; which are all incorporated herein by reference in their entirety. The present disclosure may also be applied to U.S. Publication No. US 2015/0007500 A1, filed Jun. 20, 2014 and entitled "Powered Garage Door Opener" which is incorporated herein by reference in its entirety. These patent applications make clear how various components of the electromechanical strut 10 of the present disclosure function relative to one another, and how the strut 10 and the systems and methods for electronic control unit wake-up on movement of a controlled member and protection from motor back electromotive force of the present disclosure can be incorporated into a vehicle application. The present disclosure may also be applied to U.S. Publication No. US 2015/0007500 A1 filed Jun. 20, 2014 and entitled "Powered Garage Door Opener" which is incorporated herein by reference in its entirety.

Still referring to FIGS. 1 and 2, the electromechanical strut 10' illustratively includes an outer housing 14', similar to strut housing 14, having a tubular wall with an outer surface 40' that extends along a longitudinal axis A between the opposing first and second ends 42', 44' and an inner surface 46' bounding a cavity or chamber 48' sized for at least partial receipt of the motor-gear assembly 30' therein. The motor 32', equivalent to motor 22 of the present disclosure, and planetary gearset 34' are seated within the chamber 48'. The leadscrew 36' is disposed within the telescoping unit 16', similar to telescoping unit 16, and couples to an output shaft 50' of the power drive unit 12', equivalent to power drive unit 12 of the present disclosure. In the illustrated embodiment, the planetary gearset 34', which is known in the art per se, provides about a 20:1 gear ratio reduction, by way of example and without limitation. The gearset 34' can be provided as described in any of the aforementioned references incorporated herein by reference, and can be provided having any desired gear ratio reduction. The power drive unit 12' features a coupling 52' that enables the power unit 12' to be quickly and easily attached with the telescoping unit 16'. The tubular wall of the outer housing 14' includes a pair of cylindrically-shaped tubes joined together. The motor 32' and the gearset 34' are located along the axis A between the leadscrew 36' and the electromechanical brake assembly 38', such that the brake assembly 38' is disposed between the motor 32' and the first end 42' of the housing 14', and the motor 32' is disposed between the gearset 34' and the electromechanical brake assembly 38'. The telescoping unit 16' includes the single-walled extensible tube 18', similar to outer cover tube 18, that extends along the longitudinal axis A between opposing first and second ends 54', 56' and has an inner surface 58' bounding a cavity or chamber 60' sized for clearance receipt of the leadscrew 36'. One end 54' of extensible tube 18' is rigidly connected to the second pivot mount 24', similar to second pivot mount 20, while the other end is rigidly connected to the first pivot mount 20', similar to first pivot mount 19, such as via mating helical threads for interconnecting the parts, by way of example and without limitation. An electrical lead 106' is configured to be in electrical communication with an ECU 30, 130 as will be described in more detail herein below, and in particular, with an ECU 30, 130 provided on an electronic board 29 e.g. PCB of the motor 32' which can include power leads and hall sensor leads. Hall sensors 199 may also be provided on the PCB 29 adjacent to the motor shaft 98'. When the motor 32' is energized via electrical current from the lead 106', the motor shaft 98' rotates about the axis A to drive the planetary gearset 34', and thus the leadscrew 36', thereby driving the drive nut 62' and extensible tube 18' axially to various positions. For example, the motor shaft 98' can drive the telescoping unit 16' to an extended position as shown in FIG. 1 to open the lift gate 21, or side door 13, or other closure member of the vehicle 11. The motor shaft 98' can also drive the telescoping unit 16' to a contracted position as shown in FIG. 2 to close the lift gate 21 or door 13.

Referring back to FIG. 1, in addition to FIG. 2, an electronic control unit (ECU) 30 is electrically coupled to the electromechanical strut 10 and to the vehicle voltage supply 25 and the vehicle ground 28 of an electrical system of the vehicle 11, to control the motor 22 and movement of the electromechanical strut 10, which in turn controls the opening, closing and stopping of lift gate 21. The electronic control unit 30 includes a microprocessor or microcontroller 32 for operating the electromechanical strut 10 and the electronic control unit 30. Illustratively, the electronic control unit (ECU) 30 may be provided on the vehicle 11 body, for example as integrated into a Body Control Module 500, or as a standalone unit, or in accordance with yet another illustrative embodiment the electronic control unit (ECU) 30 can be integrated into a latch control module 400 provided within the lift gate 21 and as referred to using the reference numeral 30', or still in accordance with another illustrative embodiment the electronic control unit (ECU) 30 can be integrated into a smart latch 23 coupled to the lift gate 21 and as referred to using the reference numeral 30". The term "electronic control unit" ("ECU") is used herein to refer to any machine for processing data, including the data processing systems, computer systems, modules, controllers, control units, microprocessors or the like for providing control of the systems and performing the steps of the methods described herein, which may include hardware components and/or software components for performing the processing, steps, instructions, and algorithms described herein to provide the control of such systems and execute such methods. The present disclosure may be implemented in any computer programming language provided that the operating system of the electronic control unit provides the facilities that may support the requirements of the present disclosure. Any limitations presented would be a result of a particular type of operating system or computer programming language and would not be a limitation of the present disclosure. The present disclosure may also be implemented in hardware or in a combination of hardware and software. It is understood that in the following description, details are set forth to provide an understanding of the disclosure. In some instances, certain software, circuits, structures, techniques, instructions, steps and methods have not been described or shown in detail in order not to obscure the disclosure.

Figure 3:
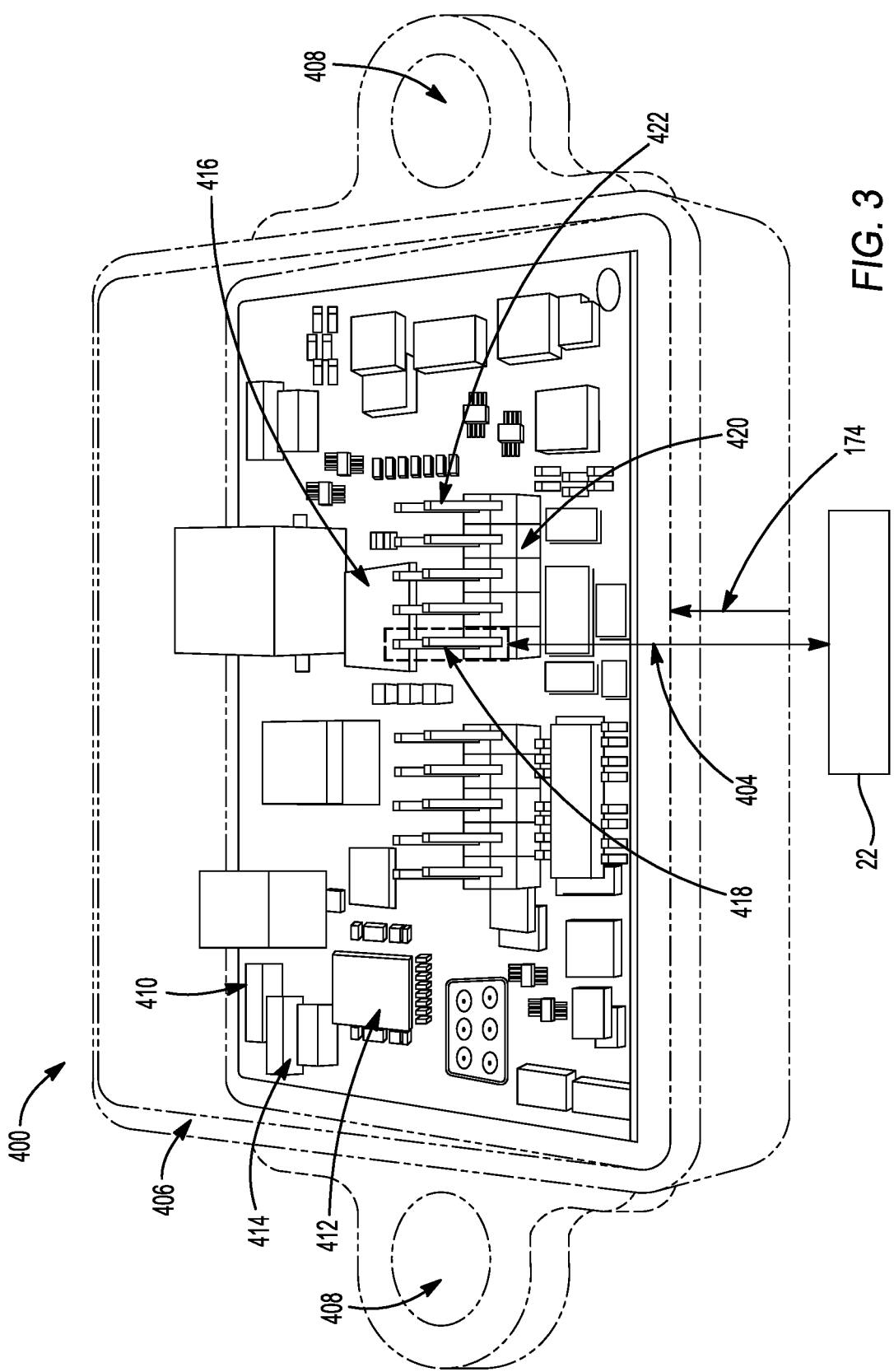
FIG. 3 is a perspective view of a latch control module including an electronic control unit, in accordance with an illustrative embodiment.

Still referring to FIG. 1, in addition to FIG. 3, in accordance with an illustrative embodiment, there is shown a latch control module 400 and a smart latch 402 (an enhanced version of latch 23 being configured with a control unit for advanced control functionality, and backup energy source) or e-latch, which are shown mounted in locations within the controlled member (e.g., lift gate 21) (i.e. being spaced apart and external/remote from the electromechanical strut 10), and are coupled to the electromechanical strut(s) 10 via a communication path illustratively established over electrical connection(s) 404 (e.g. wired and/or wireless communication). The electrical connection(s) 404 can be used to supply operating power to the electromechanical strut 10, which may be illustratively provided from a main vehicle power source, such as the vehicle main battery 25, or other power source and/or backup energy source. Electronic control unit 30 may be incorporated into latch control module 400 or smart latch 402, in accordance with illustrative embodiments. Latch control module 400 may alternatively be located on the vehicle body 11.

Still referring to FIG. 1 and FIG. 3, latch control module 400 includes a housing 406 for enclosing various latch control electronic components mounted to a support structure, such as a printed circuit board. Illustratively, the housing 406 is shown in semi-transparency for viewing the internal components which will be described herein below. The housing 406 may include mounting features, such as apertures 408 for fixing the housing 406 to the vehicle body 11 or within closure panel 21 such as to a door module (not shown) or a structure of the lift gate 21 using screws or other connectors e.g. snaps, rivets, nuts and bolts, or otherwise. The latch control module 400 includes a printed circuit board 410 enclosed by the housing 406 for supporting the various latch control electronics and components mounted thereto in coordinated electrical communication with one another. Such electronic components may include hardware and software components such as a microcontroller 412 and memory modules 414, such as microchips, for storing instructions and algorithms (e.g. code) for execution by the microcontroller 412, as well as resistors, inductors, and capacitors and other signal conditioning/supporting components for operating the microcontroller 412 and memory modules 414 of the latch control module 400 to control the electromechanical strut 10 and optionally latch 23. For example, instructions and algorithms stored on the memory module 414 may be related to various system modules, for example application programming interfaces (API) modules for a latch API, drive API, digital input output API, Diagnostic API, Communication API, and communication drivers for LIN communications and CAN bus communications. Also provided may be microcontroller drivers such as LIN drivers, CAN drivers, SPI, I/O control, power control, memory manager and mode control for microcontroller management, control functions for the lift gate 21 (e.g. opening or closing speed, direction), and input/output control modules. Also provided are mechanical subsystem modules, such as for latch control of latch 23 and interfacing therewith. While modules are described as being loaded into a memory 414, it is understood that the modules could be implemented in hardware and/or software. Also included may be FET hardware such as an H Bridge FET 416 (Field Effect Transistors) and software loaded into the memory 414 such as FET APIs. Such control functionality of the lift gate 21 may be stored as instructions in the memory 414 as executed by the microprocessor 412 to control H Bridge FET 416 (Field Effect Transistors) to provide coordinated power to the motor 22 of the electromechanical strut 10, e.g. FETS 416 controlled as load switches to connect or disconnect a source of electrical energy (voltage and/or current) as controlled by the microprocessor 412 or a FET driver to control the motor 22. Illustratively, the microprocessor 412 is electrically directly or indirectly connected to the H Bridge FET 416 for control there of (e.g. for controlling of FET switching rate). For example, the switching frequency of FETS 416 may be adjusted as controlled by the microprocessor 412 to adjust the power allowed to be conducted to the motor 22 for controlling the movement of the closure member 21. The H Bridge FET 416 are shown as illustratively connected to the electromechanical strut (s) 10 via the electrical connection(s) 404 which are connected to connector pins 418 of a connector mount 420 mounted to the printed circuit board 410. Back EMF voltage signals 174 as will be described in more detail below may be illustratively received by the microprocessor 412, or the electronic control unit 30, for processing thereby in accordance with the further teachings herein, through the same electrical connectors 404 providing power to the motor 22. Connector pins 422 may be provided and be in electrical communication with Hall sensors 199 provided within the electromechanical strut 10 for receiving position signals. Electronic control unit 30 of the first exemplary embodiment as described in detail herein below may be implemented in the latch control module 400 whereby the comparator subsystem 136 may be internal to the microprocessor 412 for waking up the microprocessor 412 to perform the mid-travel power operations, position monitoring, prompt wake-up sequencing, robust latch 23 cinching from fast latch signal transitions during manual closure events, and the like, all while reducing dark sleep (current) usage by the latch control module 400. While electronic control unit 30 is illustrated as being embodiment in latch control module 400, it is understood it may be integrated into another system, such as smart-latch 402, or within the electromechanical strut 10 provided with an internal printed circuit board, such as PCB 29, microprocessor 31, memory 33, and FETs 35, such as FET 200, for example.

Figure 4:
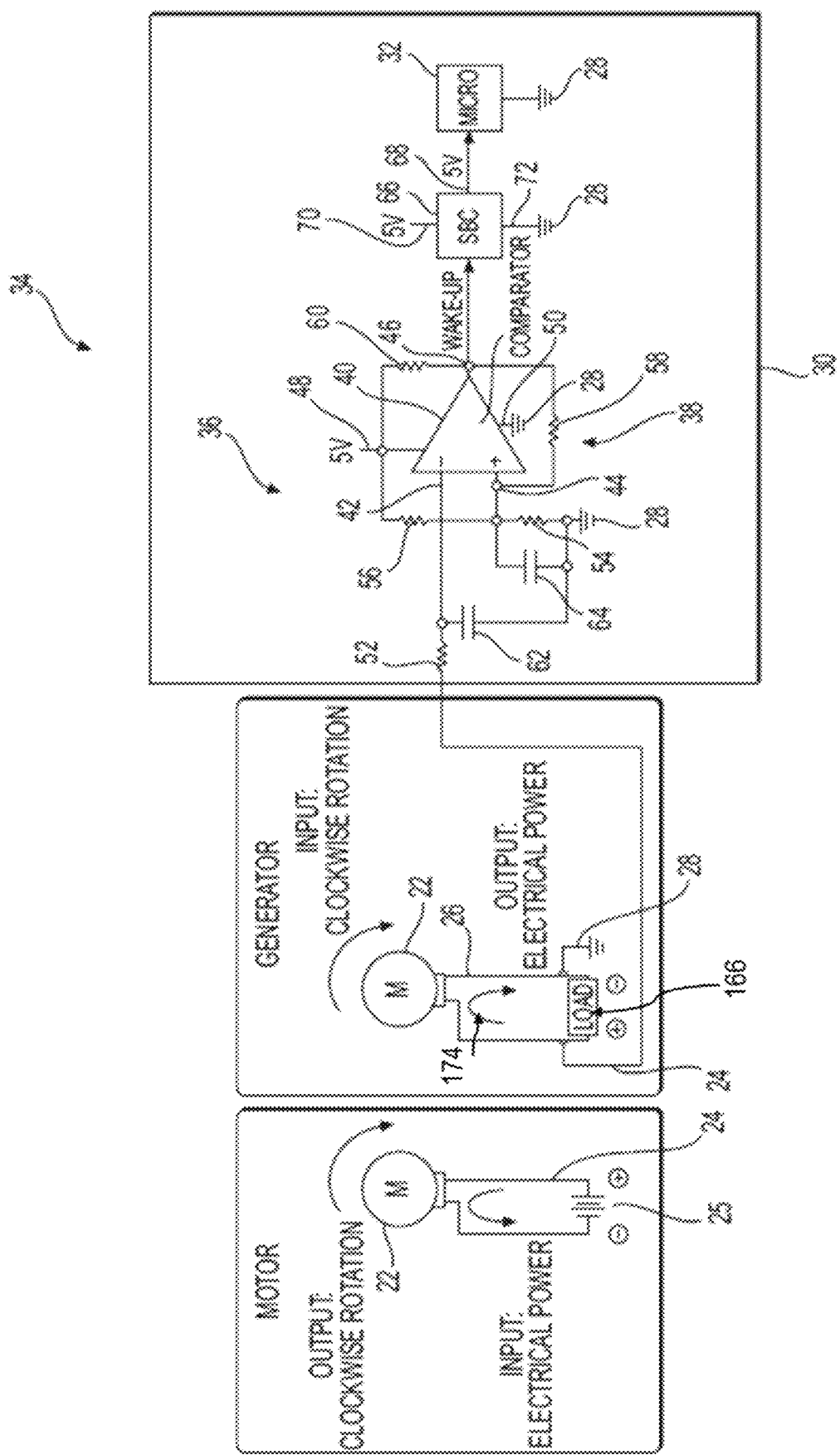
FIG. 4 illustrates a first exemplary embodiment of a system for waking an electronic control unit upon movement of a controlled member such as the powered lift gate of FIG. 1, employing a differential operational amplifier, in accordance with aspects of the disclosure.

Now referring to FIG. 4 in addition to FIG. 1, a first exemplary embodiment of a system 34 for waking the electronic control unit 30 upon movement the lift gate 21 of the vehicle 11 and protecting the electronic control unit 30 from back electromotive force (EMF) generated by the electric motor 22 when back driven by a manual movement of the lift gate 21 is provided. For example, the system 34 includes a comparator subsystem 36 disposed within the ECU 30 that comprises a low power comparator circuit 38 including a comparator unit 40 (e.g., a differential amplifier) electrically coupled to the positive motor terminal 24. The comparator unit 40 includes a negative comparator input 42 and a positive comparator input 44 and a comparator output 46 as well as a comparator voltage supply input 48 for connection to a supply voltage (e.g., 5 volt supply within the ECU 30 or from vehicle voltage supply 25) and a comparator voltage ground 50 for connection to a ground (e.g., vehicle ground 28). The comparator unit 40 compares two voltages, one at the negative comparator input 42 and another at the positive comparator input 44 and outputs a digital signal at the comparator output 46 indicating which of the negative comparator input 42 and the positive comparator input 44 is larger. In accordance with an illustrative embodiment, the reference voltage at the positive comparator input 44 is set based on the voltage divider circuit established by resistors 56, and 54. A plurality of comparator resistors 52, 54, 56, 58, 60 and comparator capacitors 62, 64 are electrically coupled to the negative comparator input 42 and the positive comparator input 44 and the comparator output 46 and the comparator voltage supply input 48. While the comparator subsystem 36 is disposed within the ECU 30 in system 34, it should be appreciated that it could instead, be separate from the ECU 30. For example, comparator subsystem 36 could be disposed on a common support as that of the ECU 30, such as a printed circuit board, and be electrically coupled together via electrical traces formed on the printed circuit board as is commonly known in the art.

In more detail, the plurality of comparator resistors 52, 54, 56, 58, 60 includes a first comparator resistor 52 electrically connected between the positive motor terminal 24 and the negative comparator input 42. A second comparator resistor 54 is electrically connected between the positive comparator input 44 and a comparator ground (e.g., vehicle ground 28). A third comparator resistor 56 is electrically connected to between the positive comparator input 44 and the comparator voltage supply input 48. A fourth comparator resistor 58 is electrically connected between the positive comparator input 44 and the comparator output 46 and a fifth comparator resistor 60 is electrically connected between the comparator output 46 and the comparator voltage supply input 48. The plurality of comparator capacitors 62, 64 includes a first comparator capacitor 62 electrically connected between the comparator ground and the negative comparator input 42. A second comparator capacitor 64 is electrically connected to between the positive comparator input 44 and the comparator ground (e.g., vehicle ground 28).

The comparator subsystem 36 also includes a systems basis chip (SBC) 66, a standalone power management integrated circuit for the microcontroller 32, that is electrically coupled to the comparator output 46 and includes an SBC output 68 and an SBC voltage supply input 70 for connection to a supply voltage (e.g., from vehicle voltage supply 25) and an SBC ground 72 for connection to a ground (e.g., a ground within the ECU 30 or vehicle ground 28). The SBC output 68 is electrically coupled to an input of the microcontroller 32, such as a dedicated wake input port, of the electronic control unit 30 to provide wakeup command signals to the microcontroller 32 from a low-powered sleep mode, an inactive mode, or an unpowered mode. It is understood that the SBC 66 may be integrated into the microcontroller 32 such that the microcontroller 32 receives directly the comparator output 46. The SBC 66 may have a low quiescent current consumption in sleep mode (e.g. less than 15 µA) as compared to the sleep mode of the microprocessor 32 (e.g. more than 300 µA). The comparator unit 40 may illustratively have a low quiescent current consumption in sleep mode (e.g. less than 1 µA) as depending on the configuration of the comparator unit 40.

In operation of the first exemplary embodiment of the system 34, the comparator subsystem 36 only requires a low operating current (for example: 1 µA SBC 66 low power current draw+15 µA comparator unit 40 lower power current draw) and is able to detect the manual movement of the lift gate 21 from any gate open position and then provide a wake-up signal to the ECU 30. If the detection and wake-up is performed promptly, the ECU 30 can monitor the position of the lift gate 21 for mid-travel powered operations e.g. control electromechanical strut 10 to complete the closing or opening of the lift gate 21 subsequent to a manual movement of the lift gate 21, control a free fall of the lift gate 21 if electromechanical brake assembly 38' has failed, and monitor signal transitions of latch 23 for power cinching to complete closure of the lift gate 21 e.g. latch 23, which is configured to releaseably engage with a striker 27 provided on vehicle body 11 to release or capture the striker 27, is controlled to transition from a secondary striker capture position to a primary capture position as part of the cinching operation. An embodiment of a latch having a cinching function is disclosed in commonly owned U.S. Publication No. US 2018/0100331 A1, filed Sep. 27, 2017, entitled "Power Closure Latch Assembly With Cinch Mechanism Having Ratchet Retention Function" and which is incorporated herein by reference in its entirety.

During a gate open condition of lift gate 21, the low power comparator circuit 38 is used to detect a change in an inactive motor voltage of the electric motor 22, indicative of a manual movement of the lift gate 21. The comparator circuit 38 is used to compare the electrical output of the motor 22 of the power drive unit 12 generated due to the motor back electromotive force in response to a manual movement of the controlled member (e.g., lift gate 21) and wakes the ECU 30 based on the comparison of the electrical output of the power drive unit 12 to an electrical reference. As the operator manually moves the lift gate 21 in a closing direction, the generated voltage (by back EMF voltage 174) passes the predetermined threshold or electrical reference (established by chosen resistance and capacitance values of the plurality of comparator resistors 52, 54, 56, 58, 60 and comparator capacitors 62, 64, respectively) of the low power comparator circuit 38 causing a wake-up signal to be sent from the comparator output 46 to the SBC 66. Back EMF generated voltage 174 by the motor 22 is illustratively an opposite polarity to that when the motor 22 is driven electrically as illustrated in FIG. 4. Once awake, the SBC 66 provides power to the microcontroller 32, which then processes the wake-up signal to transition from an off mode or a low power consuming sleep mode, to an active and powered mode. Once awake, the ECU 30 then monitors the manual gate closing sequence of lift gate 21 (e.g. monitors hall sensors 199). In accordance with the first embodiment, comparator unit 40 triggers an active-low output to signal a wakeup for the ECU 30.

Figure 5:
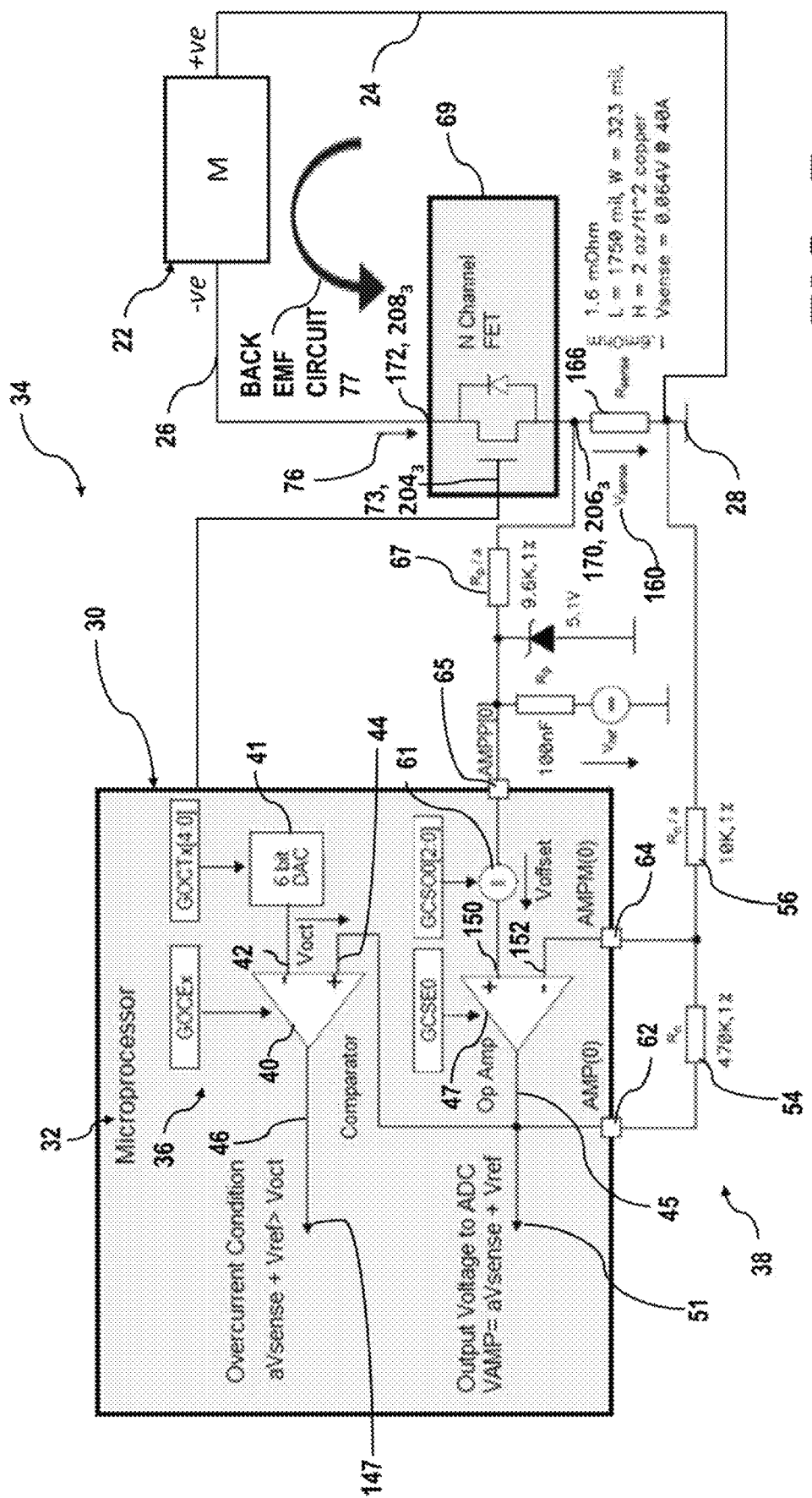
FIG. 5 illustrates a second exemplary embodiment of a system for waking an electronic control unit upon movement of a controlled member such as the powered lift gate of FIG. 1, employing a non-inverting operational amplifier, in accordance with aspects of the disclosure.

Now referring to FIG. 5, a second exemplary embodiment of a system 34 for waking the electronic control unit 30 upon movement the lift gate 21 of the vehicle 11 and protecting the electronic control unit 30 from back electromotive force (EMF), for example from the electric motor 22 is provided. The system 34 includes a comparator subsystem 36 disposed within the ECU 30 that comprises a low power comparator circuit 38 including a comparator unit 40 (e.g., a non-inverting differential amplifier) electrically coupled to a voltage reference inputted from a selectable 6-bit ADC 41 output to a negative comparator input 42 and a differential operational amplifier 47 output coupled to a positive comparator input 44. The comparator unit 40 compares two voltages, one at the negative comparator input 42 (i.e. a predetermined electrical reference voltage level) and another at the positive comparator input 44 (i.e. an amplified back EMF sensed voltage 160) and outputs a digital signal at the comparator output 46 indicating which inputted voltage is larger. The comparator output 46 is electrically connected to a wake-up trigger input 147 of microprocessor 32, illustratively internal to the microprocessor 32, to trigger power on or power up of the microprocessor 32 from a low power sleep or off state when the it is determined by the comparator unit 40 that the voltage level inputted to the negative comparator input 42 reaches and/or exceeds the predetermined reference voltage trigger level, designated $V_{oct}$, such as when the negative comparator input 42 voltage level is greater than an amplified back EMF voltage (aV$_{sense}$) offset optionally by a reference voltage level (V$_{ref}$). The positive comparator input 44 is connected to operational amplifier output 45 of operational amplifier 47. The operational amplifier 47 amplifies and shifts/offsets the input voltage, and more specifically amplifies the voltage input at the positive open amp input 150 (i.e. consisting of sensed Back EMF voltage 160 offset by a voltage reference level as determined by a selectable electrical reference voltage supply V$_{offset}$ 61) and outputs the amplified operational amplifier output 45. Operational amplifier output 45 is also electrically connected to an ADC internal input port 51 of the microprocessor 32 which is processed by the microprocessor 32 to control the ADC 41 selectable 6-bit ADC for setting the level of electrical reference voltage V$_{oct}$ to be inputted at negative comparator input 42 for ensuring the comparator unit 40 is configured at appropriate comparable levels with the voltage level input at the positive comparator input 44 to enhance sensitivity of detection and comparison of the back EMF. The electrical reference level is thus dynamically set based on the input back EMF voltage 160 level. The microprocessor 32 is thus configured to set the electrical reference signal to be inputted at negative comparator input 42 as a function of the sensed back EMF voltage level. Providing a dynamic and adjustable electrical reference input to the comparator input 44 based on the sensed back EMF increases the sensitivity of the comparison operation by comparator unit 40 for generating a trigger wake signal for ECU 30, which allows the ECU 30 to be quickly powered and perform the required time sensitive operations such as monitoring, powered gate control, and other controls (e.g. cinching, braking).

Still referring to FIG. 5, a plurality of non-inverting operational amplifier resistors 54, 56, are provided for controlling the gain of the operational amplifier 47 to amplify the sensed back EMF voltage 160, and illustratively by the preconfigured gain factor defined by the resistor values e.g. Av=1+R$_{54}$/R$_{56}$. Resistors 54, 56 (R$_{54}$, R$_{56}$) are illustratively provided external the microprocessor 32 and electrically connected to microprocessor input ports AMP(0) 62 and AMPM(0) 64. Resistor 54 is illustratively 470 KΩ whereas resistor 56 is illustratively 10 KΩ for a gain factor of forty eight (48). Resistor 54 is therefore electrically coupled to the negative operational amplifier input 152 and the operational amplifier output 45 for providing a voltage divided feedback signal to negative operational amplifier input 152, while resistor 56 is electrically coupled to the resistor 54, to the negative operational amplifier input 152, to resistor 67, and to the resistor 166, and to ground 28. Resistor 67 is electrically coupled to an input port 65 of the microprocessor 32. Resistor 166 is also electrically coupled to ground 28. Resistor 166 is electrically connected between positive motor terminal 24 and the negative motor terminal 26 through MOSFET source terminal 170 of MOSFET 69. MOSFET drain terminal 172 is connected to negative motor terminal 26, such that a back EMF generated current 76 flows through the MOSFET 69 (illustratively MOSFET 200$_4$ of FIG. 11) when the MOSFET 69 is switched to ON by applying a control signal by the microprocessor 32 to the MOSFET 69 gate terminal 73 (illustratively MOSFET gate terminal 2043 of FIG. 11). As in the illustrative example of FIG. 5, when the motor 22 is manually moved as imparted by the manual movement of the lift gate 21, the generated back EMF current 76 in the closed loop circuit 77 is allowed to flow through resistor 166 to generate a sensed back EMF voltage 160. For example, resistor 166 has a resistance value of 1.6 ms) and will generate a sensed back EMF voltage 160 (V$_{sense}$) of 0.032 Volts when back EMF generated current 76 is illustratively twenty (20) amps. The sensed back EMF voltage 160 generated at source terminal 170 is fed into the positive open amp input 50 as described hereinabove and is amplified by the operational amplifier 47 by a gain of 48 to amplify the sensed voltage 160 to 1.563 Volts. This value may be optionally offset by the selectable electrical reference voltage supply V$_{offset}$ 61 for compensating for input error known as Input Offset Voltage. This error compensation gets amplified along with the sensed voltage 160 to add a compensating error level to the output voltage being read by the microprocessor 32 and also being supplied to the comparator unit 40 internal to the microprocessor 32. In the mathematical example described, the input voltage to operational amplifier 47 of 0.032 Volts is amplified to a more manageable comparable voltage level input of 1.536 Volts supplied to the positive comparator input 44 so that the comparator unit 40 can accurately compare the sensed back EMF voltage 160 without reference voltages derived from a supplied voltage level to the microprocessor 32, such as 5 Volts. The predetermined or dynamically selected reference voltage trigger level, designated V$_{oct}$ may be illustratively set at 1.5 Volts, in which case comparator unit 40 will generate a high (i.e. 1 Volt signal) level indicating an overcurrent condition to the microprocessor 32 that the sensed back EMF voltage 160 is sufficient to wake up the microprocessor 32 as a result of the manual movement of the lift gate 21. While the comparator subsystem 36 is illustrated as being disposed within the ECU 30 in system 34 of FIG. 5, it should be appreciated that it could instead, be separate from the ECU 30. In accordance with this second embodiment, the comparator unit 40 is used to trigger an active-low (Ground) signal to the microprocessor 32 that an overcurrent condition has occurred.

Figure 6:
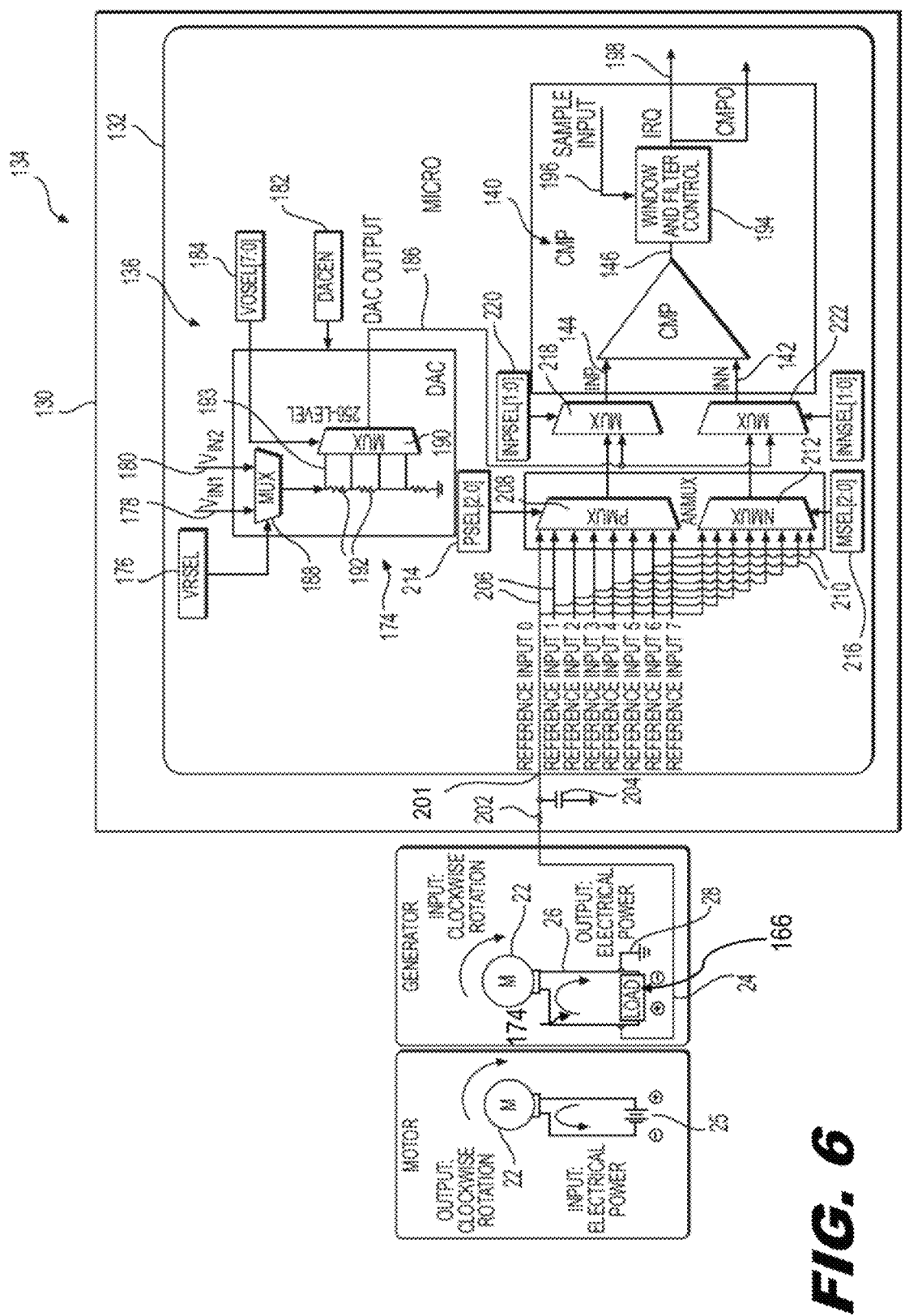
FIG. 6 illustrates a third exemplary embodiment of a system for waking an electronic control unit upon movement of a controlled member such as the powered lift gate of FIG. 1, in accordance with aspects of the disclosure.

A third exemplary embodiment of a system 134 for waking the electronic control unit 130 upon movement the lift gate 21 of the vehicle 11 and protecting the electronic control unit 130 from back electromotive force (EMF) from the electric motor 22 is also provided, as shown in FIG. 6. The microprocessor 132 of the electronic control unit 130 of the third exemplary embodiment includes the comparator subsystem 136. In other words, the comparator subsystem 136 is internal to the microprocessor 132. The comparator subsystem 136 includes a digital-to-analog convertor (DAC) 174 including a VRSEL input 176 and a V$_{in1}$ input 178 and V$_{in2}$ input 180 and a DACEN input 182 and a VOSEL input 184 and a DAC output 186. The DAC 174 includes a first DAC multiplexor (MUX) 188 with the V$_{in1}$ input 178 and the V$_{in2}$ input 180 as inputs and controlled by the VRSEL input 176. An output of the first MUX 188 is connected to a second MUX 190 through a plurality of DAC resistors 192 interconnected between a plurality of second MUX inputs 193 and controlled by the VOSEL input 184. The DAC output 186 is an output of the second MUX 190.

The comparator subsystem 136 also includes a comparator unit 140 that includes a negative comparator input 142 and a positive comparator input 144 and a comparator output 146. The comparator unit 140 compares the negative comparator input 142 and the positive comparator input 144 and outputs a digital signal at the comparator output 146 indicating which is larger. The comparator output 146 is connected to a window and filter control unit 194 having a sample input 196 and an interrupt request (IRQ) output 198. The positive motor terminal 24 of electric motor 22 is input to a microcontroller input 201 of the microcontroller 132 through an input resistor 202 tied to a ground (e.g., a ground within the ECU 130 or the vehicle ground 28) through an input capacitor 204 for protecting the microcontroller 132. The microcontroller input 201 is connected to a plurality of PMUX inputs 206 of a PMUX 208 and a plurality of NMUX inputs 210 of an NMUX 212 which are respectively controlled by a PSEL input 214 and an MSEL input 216. An output of the PMUX 208 is connected to a positive input MUX 218 along with the DAC output 186 and the positive input MUX 218 is controlled by an INPSEL input 220. An output of the NMUX 212 is connected to a negative input MUX 222 along with the DAC output 186 and the negative input MUX 222 is controlled by an INNSEL input 224. Outputs of each of the positive input MUX 218 and the negative input MUX 222 are connected to the positive comparator input 144 and the negative comparator input 142 of comparator unit 140, respectively. The multiplexers described are used to select a programmable DAC (Digital to Analog Converter) signal voltage used as a reference voltage for the internal comparator 140 for overcurrent detection. It allows to pick a programmable voltage to use for overcurrent detection. For some applications the inputted back EMF 174 signal to the comparator unit 140 may be 10 Amps and for others it make be 30 Amps, as but examples, and the microprocessor 32 can therefore control the reference electrical signal by controlling the multiplexers to select the appropriate reference input to the multiplexor. For example, the 0 to 7 analog reference inputs into NMUX inputs 210 and PMUX 208 may be selected as the electrical reference point. As a result the comparator subsystem 136 can be tuned or controlled by the microprocessor 32 depending on the application (e.g. the expected Back EMF 174 to be generated by the movement of the controlled member), and also optionally the comparator subsystem 136 can dynamically adjust the reference signal level using the selectable reference signal levels as inputted into the comparator unit 40 using the multiplexors.

In operation of the third exemplary embodiment of the system 134 during the gate open condition of the lift gate 21, the comparator subsystem 136 of the microcontroller 132 is used to detect a change in the inactive motor voltage of the electric motor 22. In more detail, the comparator subsystem 136 is used to compare the electrical output of the motor 22 of the power drive unit 12 generated due to the motor back electromotive force in response to a manual movement of the controlled member (e.g., lift gate 21) and wakes the ECU 130 based on the comparison of the electrical output of the power drive unit 12 to an electrical reference. As the operator manually moves the lift gate 21 in the closed direction, the generated voltage (back EMF 174) passes the predetermined threshold or electrical reference of the comparator subsystem 136 causing a wake-up signal to the microcontroller 132. The DAC output 186 of the DAC 174 sets the electrical reference or programmable reference voltage for the trigger point. Once awake, the microcontroller 132 processes the wake-up signal and monitors the manual lift gate 21 closing sequence.

Figure 7:
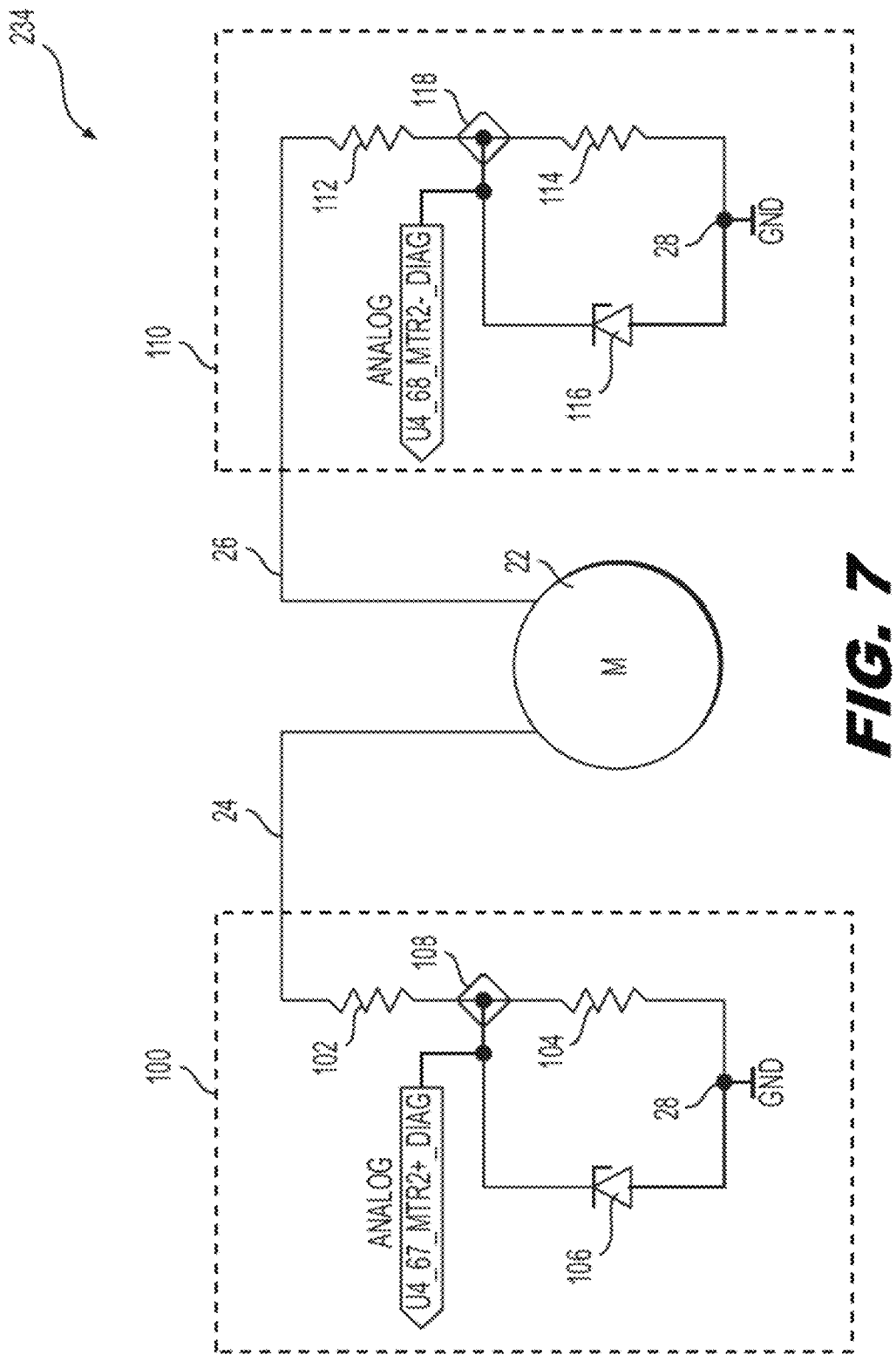
FIG. 7 illustrates a back EMF voltage attenuation circuit, in accordance with aspects of the disclosure.
Figure 7A:
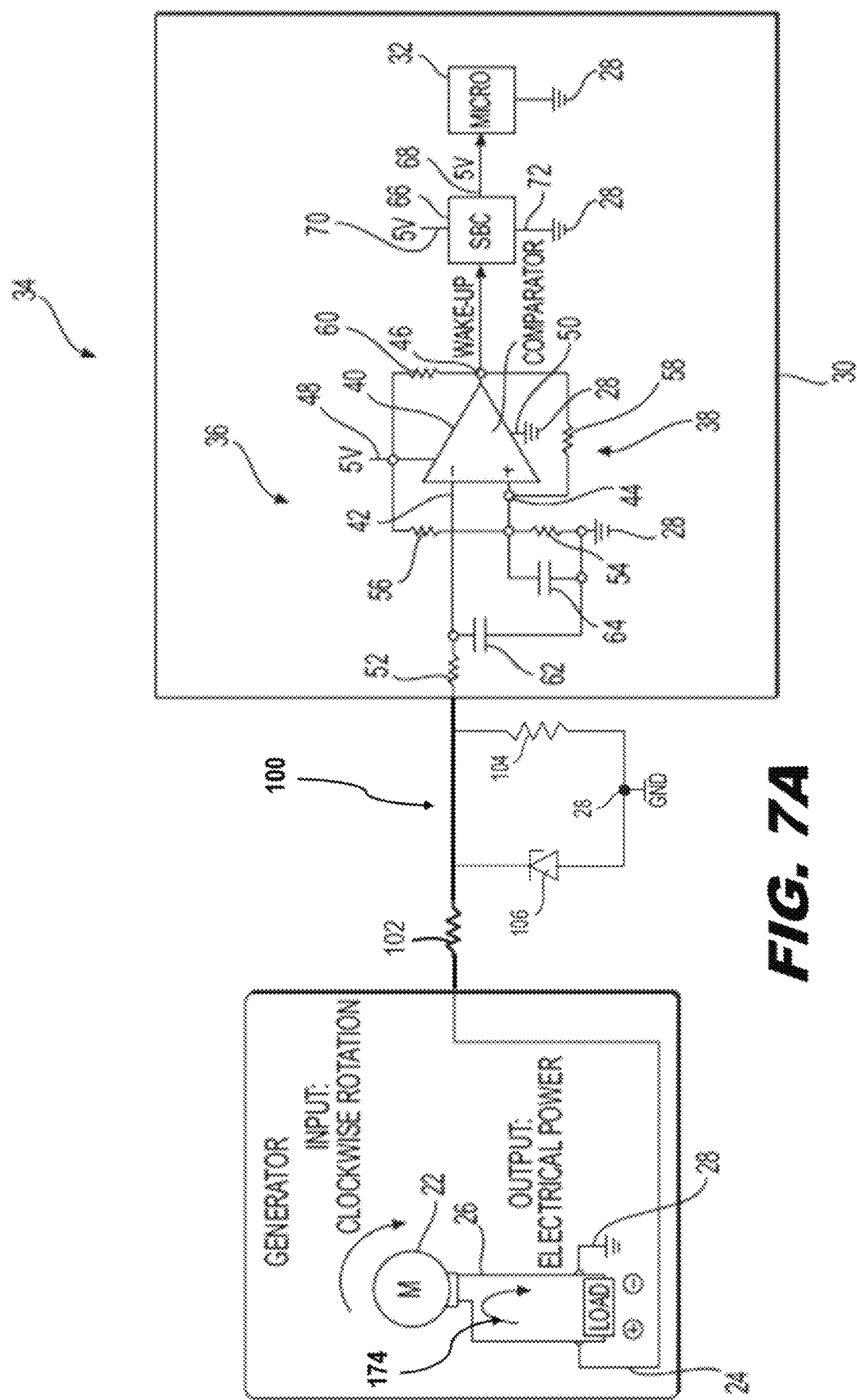
FIG. 7A illustrates the back EMF voltage attenuation circuit of FIG. 7 electrically connected between the motor of an electromechanical strut and the system for waking an electronic control unit of FIG. 4, in accordance with an illustrative embodiment.

A fourth exemplary embodiment of a system 234 for waking the electronic control unit 130 upon movement the lift gate 21 of the vehicle 11 and protecting the electronic control unit 130 from back electromotive force (EMF) from the electric motor 22 is also provided, as shown in FIG. 7. The system 234 includes a first conditioner circuit 100 connected to the positive motor terminal 24 of the electric motor 22 to measure the output voltage thereupon and to convert that output voltage to a signal suitable for monitoring by an analog input of a microcontroller 32, 132, for example, by converting the output voltage of the generated back EMF 174 for example which may range upwards of 100 Volts, to a 0-5 VDC signal for input to the negative comparator input 42, for example of the system 34. The first conditioner circuit 100 includes sixth and seventh comparator resistors 102, 104, connected in series between the vehicle ground 28 and the positive motor terminal 24, which preferably provide a fairly high impedance to minimize power loss therein. The sixth and seventh comparator resistors 102, 104 may have values of, for example, 95.3 kΩ, and 5 kΩ respectively. The sixth and seventh comparator resistors 102, 104 defining a first output node 108 between them, which is driven to a voltage as a fraction of the output voltage on the positive motor terminal 24. In an embodiment, the first output node 108 is connected to a first analog input of a microcontroller 32, 132, for example to the input port 65 of the second illustrative embodiment of FIG. 5, which compares that voltage to a predetermined value. Once the voltage of the first output node 108 exceeds the predetermined value, the microcontroller 32, 132 then causes the ECU 30, 130 to wake. A first voltage regulator 106 is connected between the first output node 108 and the vehicle ground 28 to clamp the maximum voltage on the first output node 108 and thereby avoid damaging the microcontroller 32, 132 by application of excessive voltage. The first voltage regulator 106 may be a zener diode, which may have a value of, for example, 5.1 Volts. Referring now to FIG. 7A, there is illustrated another example of a first conditioner circuit 100 applied between the positive motor terminal 24 and an input to the negative comparator input 42 of the system 34 to attenuate the generated back EMF voltage 174 to be supplied to the negative comparator input 42.

The fourth exemplary embodiment of the system 234 also includes a second conditioner circuit 110 connected to the negative motor terminal 26 of the electric motor 22 to measure the output voltage thereupon and to convert that output voltage to a signal suitable for monitoring by an analog input of a microcontroller 32, 132, for example, by converting the output voltage to a 0-5 VDC signal. The second conditioner circuit 110 may be similar in construction to the first conditioner circuit 100. The second conditioner circuit 110 includes eighth and ninth comparator resistors 112, 114, connected in series between the vehicle ground 28 and the negative motor terminal 26, which preferably provide a fairly high impedance to minimize power loss therein. The eighth and ninth comparator resistors 112, 114 may have values of, for example, 95.3 kΩ, and 5 kΩ respectively. The eighth and ninth comparator resistors 112, 114 define a second output node 118 between them, which is driven to a voltage as a fraction of the output voltage on the negative motor terminal 26. The second output node 118 is connected to a second analog input of a microcontroller 32, 132, which compares that voltage to a predetermined value. Once the voltage of the second output node 118 exceeds the predetermined value, the microcontroller 32, 132 then causes the ECU 30, 130 to wake. A second voltage regulator 116 is connected between the second output node 118 and the vehicle ground 28 to clamp the maximum voltage on the second output node 118 and thereby avoid damaging the microcontroller 32, 132 by application of excessive voltage. It is recognized that the conditioner circuits 100, 110 may be applied to the other embodiments of the present disclosure for preconditioning the back EMF voltage for input a comparator circuit internal or external to a microprocessor.

Figure 8:
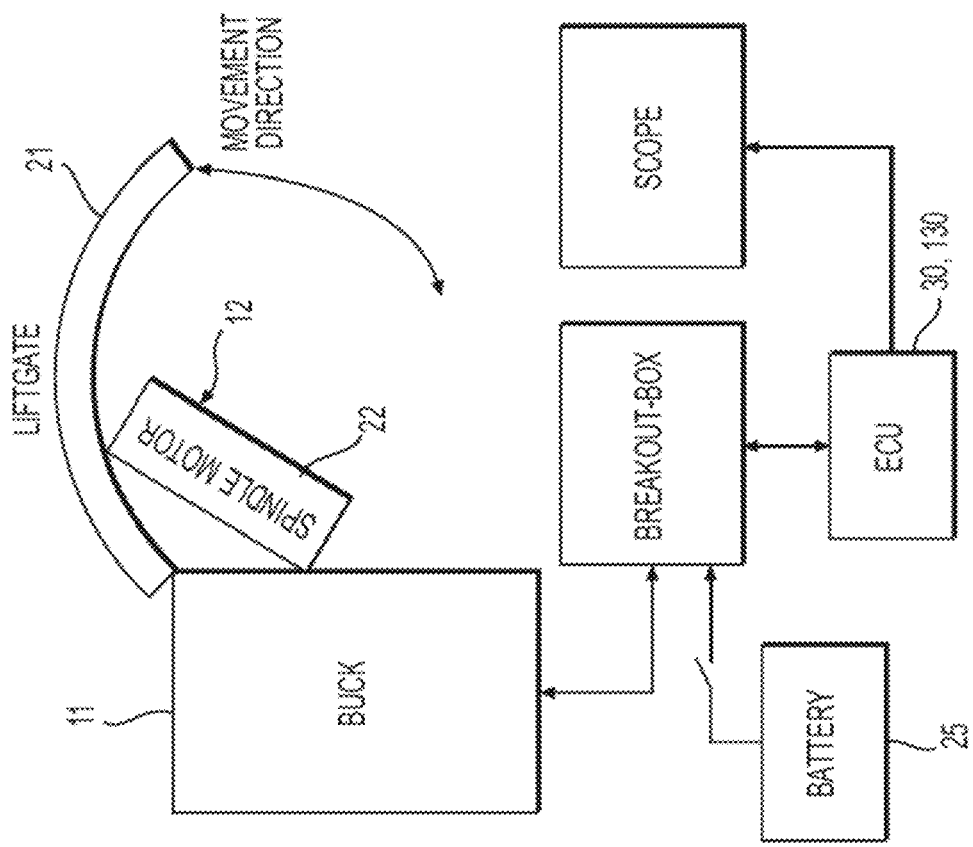
FIG. 8 illustrates a testing setup for confirming the operation of the first exemplary embodiment of the system of FIG. 4 and the second exemplary embodiment of FIG. 5 and the third exemplary embodiment of FIG. 6, in accordance with aspects of the disclosure.
Figure 9:
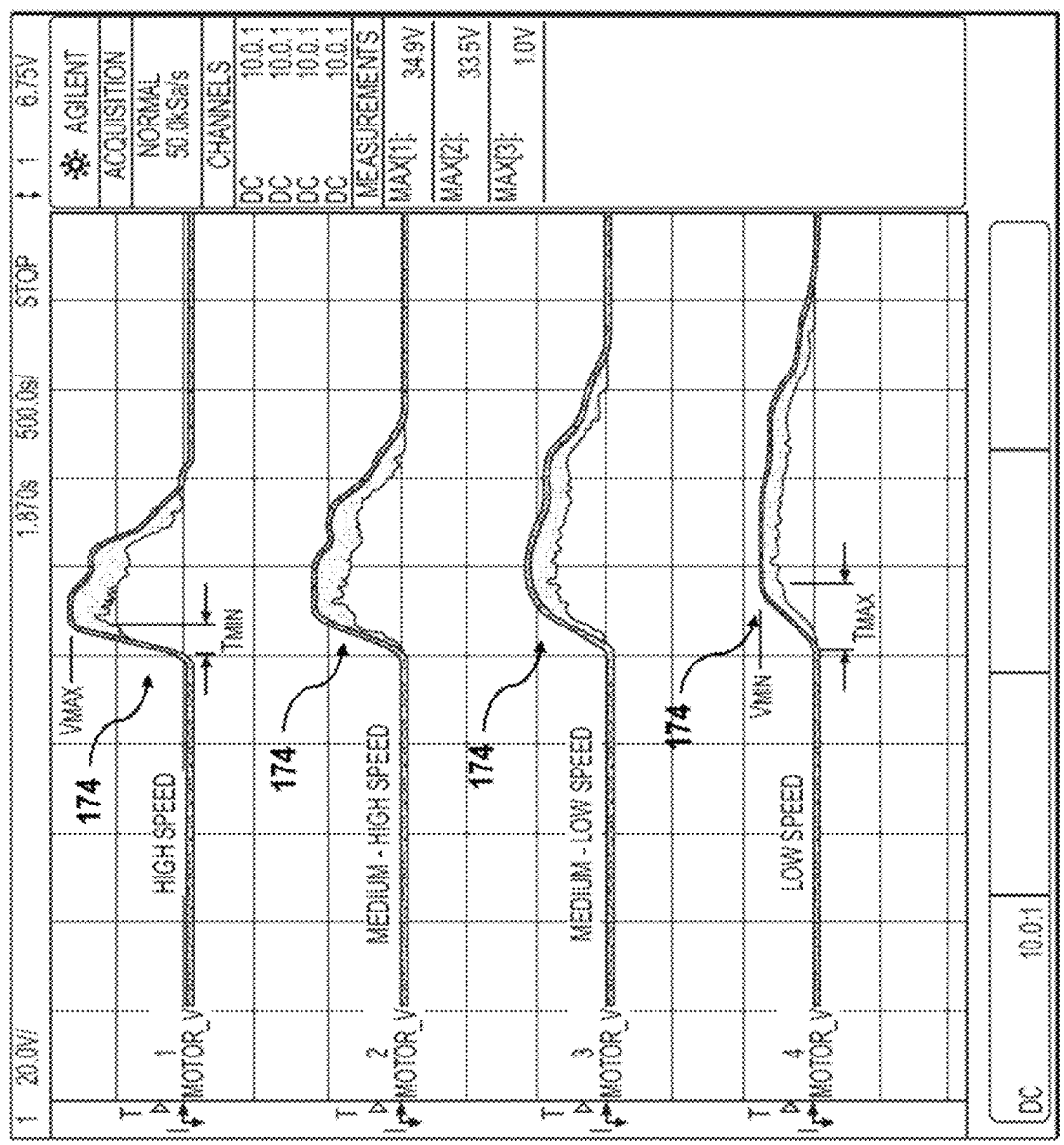
FIG. 9 illustrates generated voltages that have been captured under different manual travel speeds of the powered lift gate of FIG. 1.

The operation of the first and second exemplary embodiment of the system 34 and third exemplary embodiment of the system 134 and fourth exemplary embodiment of the system 234 is confirmed using the testing setup shown in FIG. 8. Specifically, a generated voltage of the electric motor 22 versus a travel time is captured on an oscilloscope during a manual close operation of lift gate 21. Several sequences of manually closing the lift gate 21 can be completed, where the manual travel speed is varied from fast (slamming the lift gate 21) to very slow. Example generated voltages that are captured under the different manual travel speeds are shown in FIG. 9. Through an analysis of these generated voltages, it can be verified that the different voltage and signal ramp times are within the specification and capability of the comparator subsystems 36, 136. Specifically, operation of both comparator subsystems 36, 136 with the manual travel speed experiments of the lift gate 21 can confirm the wakeup capability in a rapid response time.

Low power comparators (e.g., such as those comparator subsystem 36, 136 illustrated above) can have a current draw as low as one micro Amp. For example, if an ECU current budget during ECU sleep mode is 100 micro Amps, the low current draw of the comparator subsystem 36, 136 illustrated above can significantly reduce the current drain on the main battery 25 in comparison during open lift gate 21 conditions, such as during tailgating, camping or loading the vehicle 11, as but only non-limiting examples. Furthermore, the combination of comparator subsystems 36, 136 with the back EMF voltages from the electric motor 22 during manual operation, create a unique wake-up feature of the ECU 30, 130 not presently utilized on vehicles 11 without the cost associated with more complex wakeup circuities or the use of relays. The cost of the detection circuitry or comparator subsystems 36, 136 is minimal or even nonexistent in the configuration where the comparator unit is integrated into the microprocessor 32, for example as is in the case of the second and third exemplary embodiment of the system 34, 134.

The advantage to original equipment manufacturers (OEMs) utilizing ECUs 30, 130 incorporating the systems 34, 134, 234 disclosed herein, is the reduction in dark (sleep) currents during the gate open condition of powered tailgates (i.e., lift gate 21). The added feature of mid-travel power operations from position monitoring from prompt wake-up sequencing is also provided. Finally, robust latch cinching from fast latch signal transitions during manual closure events is available due to the ECU 30, 130 being awake (after being awakened by the system 34, 134, 234).

Figure 10:
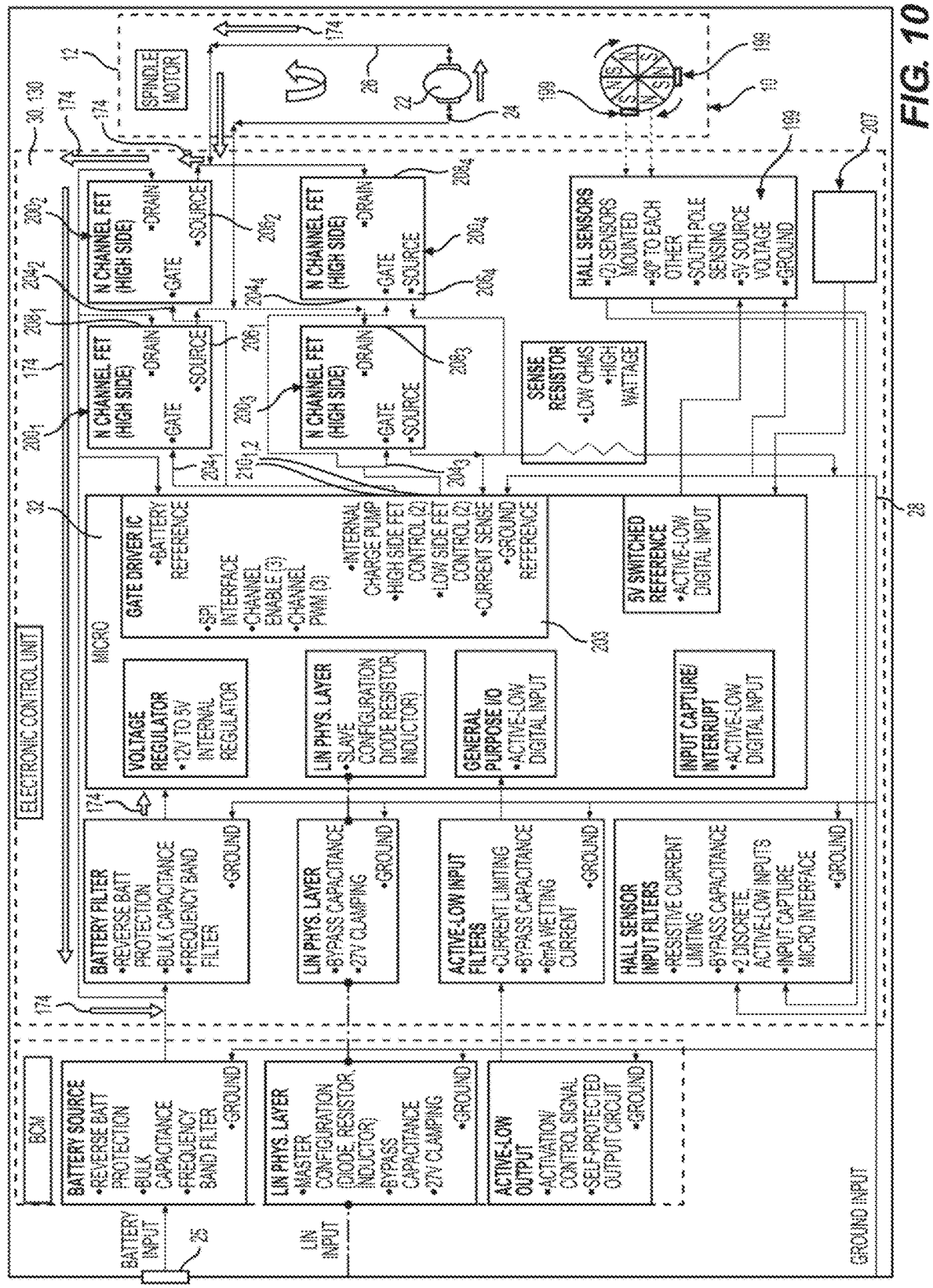
FIG. 10 illustrates a system block diagram of a system for waking an electronic control unit, in accordance with an illustrative embodiment, illustrating the propagation of back EMF to the electronic control unit.
Figure 11:
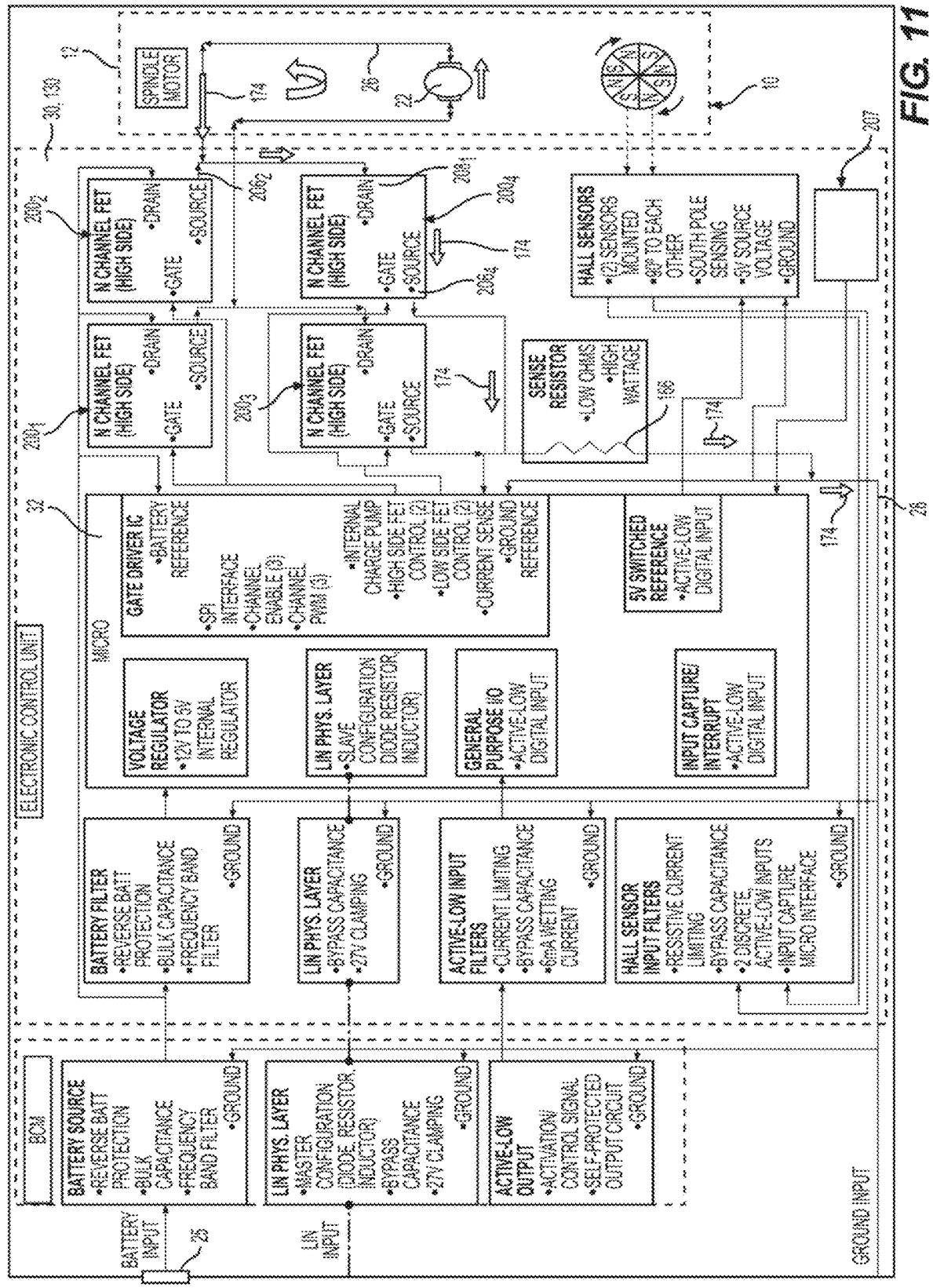
FIG. 11 illustrates a system block diagram of a system for waking an electronic control unit, in accordance with an illustrative embodiment, illustrating the controlled shunting of back EMF to ground.
Figure 12:
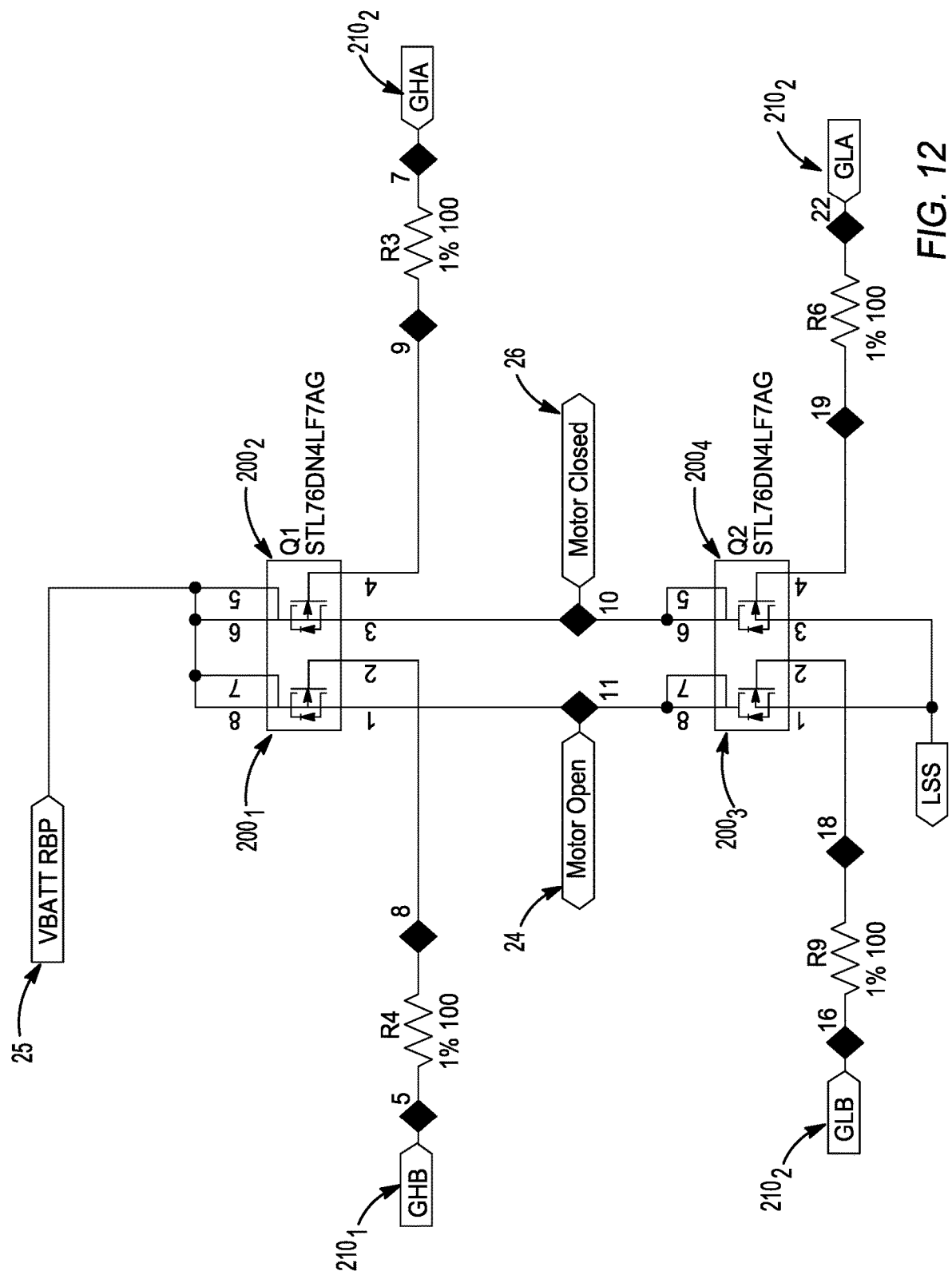
FIG. 12 illustrates a circuit diagram of a bidirectional motor control switching configuration, in accordance with an illustrative embodiment.

Now referring to FIGS. 10 to 12, the ECU 30, 130 may further include a metal-oxide-semiconductor field-effect transistor (MOSFET), or referred to herein as also "FET" to control motor 22. The electronic control unit 30, 130 is configured to control the motor 22 by controlling the switching of illustratively four Field Effect Transistors $200_{1,2,3,4}$ which control the flow and direction of power to the motor 22, and more specifically the flow of power from a voltage source such as battery 25. The microprocessor 32 of electronic control unit 30, 130 illustratively includes a gate driver 203 for issuing control signals to the FET gates $204_{1,2,3,4}$ for controlling the ON or OFF state of the FETs 200 to allow current to flow between the FET source terminal $206_{1,2,3,4}$ and the drain terminal $208_{1,2,3,4}$ of the FETs 200. Illustratively four FETs 200 are provided for selectively applying directional current for bidirectional movement of the motor 22 to open or close the lift gate 21 (i.e. clockwise and counterclockwise rotation) using a configuration as illustrated in FIG. 12. Provided between the source $206_2$ of the second FET $200_2$ and the drain $208_4$ of the fourth FET $200_4$ is connected thereto the positive motor terminal 24. Provided between the source $206_1$ of the first FET $200_1$ and the drain $208_3$ of the third FET $200_3$ is connected thereto the negative motor terminal 26. Output ports $210_{1,2}$ provided with the electronic control unit 30, 130, and illustratively electrically connected to the gate driver 203 are electrically connected to the FET gates $204_{1,2,3,4}$ for providing control signals as determined by the microprocessor 32 to control the motor 22. Microprocessor 32 illustratively supplies switching signals to the gate driver 203 that will supply the requisite high-current output required for the gates $204_{1,2,3,4}$ to control current flow between the source terminals $206_{1,2,3,4}$ and drain terminals $208_{1,2,3,4}$.

In order to protect the ECU 30, 130 from the back EMF 174, the microcontroller 32, 132 can implement specific protection algorithms or routines as executed by the control logic of microcontroller 32 from stored instructions loaded into a memory 207, such as an EEPROM or other types. While examples of such algorithms are described below as part of ECU 30, 130 and may be used as part of systems 34, 134, 234, it should be understood that the algorithms described herein may also be utilized separately from the comparator subsystems 36, 136 described above.

In a first algorithm to protect the ECU 30, 130 from the back EMF 174, the ECU 30, 130 is not powered (i.e., microcontroller 32, 132 is not powered, and no software is running) if no battery is connected to a vehicle battery wire harness coupled to the ECU 30, 130. When an operator moves the lift gate 21, an electrical output or voltage output generated by the motor 22 starts to provide energy to the ECU 30, 130. When the voltage is high enough (e.g., approximately 7 volts), the microcontroller 32, 132 in the ECU 30, 130 starts to work (i.e., the software illustratively stored in a memory unit 207, as instructions, provided for as part of the ECU 30, 130 in the microcontroller 32, 132, starts to run or be executed by the microcontroller 32, 132). Meanwhile, the in response to the execution of the software, the microprocessor 32 controls the MOSFETs 200 (i.e. FETS $200_3$, $200_4$ are turned ON, or to a conducting state (i.e. source terminals $206_{3,4}$ are electrically connected to drain terminals $208_{3,4}$), while. FETS $200_1$, $200_2$ are optionally turned OFF, or to a non-conducting state (i.e. source terminals $206_{1,2}$ are not electrically connected to drain terminals $208_{1,2}$) to selectively short the power drive unit 12 (e.g., motor's terminals 24, 26) to vehicle ground 28 to dissipate the electrical output 174 of the power drive unit 12 generated in response to the manual movement of the controlled member. Consequently, the voltage generated by the motor 22 drops to 0 volts. Thus, the ECU 30, 130 can be protected from being damaged by the back-EMF 174 flowing to the ECU 30, 130 as illustrated in FIG. 10, without adding any extra hardware components. It can also protect mechanical parts of the lift gate 21 from being damaged by high velocity slam impact since the motor 22 speed can be reduced by the grounding of its terminals 24, 26.

More specifically, in the first algorithm, the ECU 30, 130 turns on the MOSFETs 200 to short the motor's terminals 24, 26 to ground 28 for 1 second after a power on reset. Alternatively, the MOSFETs 200 are set to short the motor's terminals 24, 26 to ground 28 when the motor is not powered as default, in the event the gate is manually moved. In this configuration the wake-up of the ECU 30, 130 is not required to set the FETs i.e. FETs $200_3$, $200_4$ to electrically connect the terminals 24, 26 to ground 28. As described above, if no battery is connected to the wire harness connected to the ECU 30, 130, the ECU 30, 130 is not powered. When an operator pushes the lift gate 21, the motor 22 starts to generate electricity. When the voltage of this generated electricity is high enough, the software of the ECU 30, 130 starts to run in manners as described herein above. After a power on reset routine of the ECU 30, 130, the software turns on the MOSFET (e.g. FETS 200₃, 200₄) to short the motor terminals 24, 26 to ground 28, as illustrated in FIG. 10. As a result, the voltage generated (e.g. back EMF voltage 174) by the motor 22 drops to 0 volts, and the lift gate 21 is stopped. This algorithm prevents ECU 30, 130 from being damaged by high voltage (back EMF) generated by the motor 22, by allowing back EMF 174 to flow as illustrated in FIG. 10.

In a second algorithm to protect the ECU 30, 130 from the back EMF, the ECU 30, 130 measures the back-EMF voltage 174, and also measures the speed of the lift gate 21 (e.g., through a Hall-effect sensors 199 coupled to the motor 22 and to the microprocessor 32) after a power on reset. The ECU 30, 130 uses this information to control MOSFETs 200 to short to ground the drains 208₃, 208₃ for time periods proportional to a PWM duty ratio signal supplied to the MOSFET terminals 2043,4 by the gate driver 203 as controlled by the microcontroller 32. Using this closed-loop control algorithm, the ECU 30, 130 is able to regulate the back-EMF voltage by controlling the speed of the motor 22 to a safe range by shorting the terminals 24, 26 over time by generating a PWM duty ratio for controlling the FETs 200 (e.g. FETS 200₃, 200₄), the PWM (pulse width modulated) duty cycle being varied based on the detected speed of the lift gate 21 and/or the speed of motor 22; protect ECU 30, 130 from high back-EMF voltage; and prevent mechanical parts from being damaged by high impact force (by reducing the closing velocity of lift gate 21).

Figure 13:
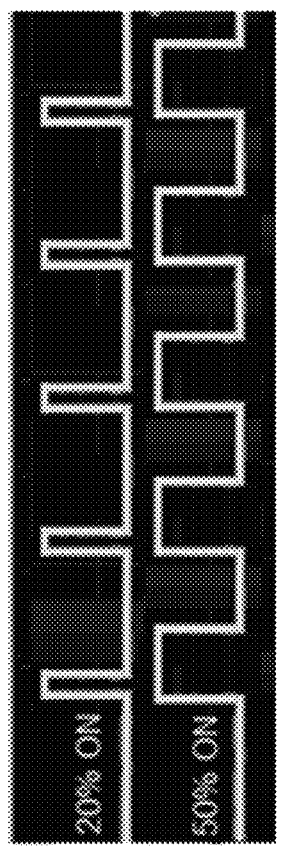
FIG. 13 illustrates exemplary pulse width modulated FET switching control signals, in accordance with an illustrative embodiment.
Figure 14:
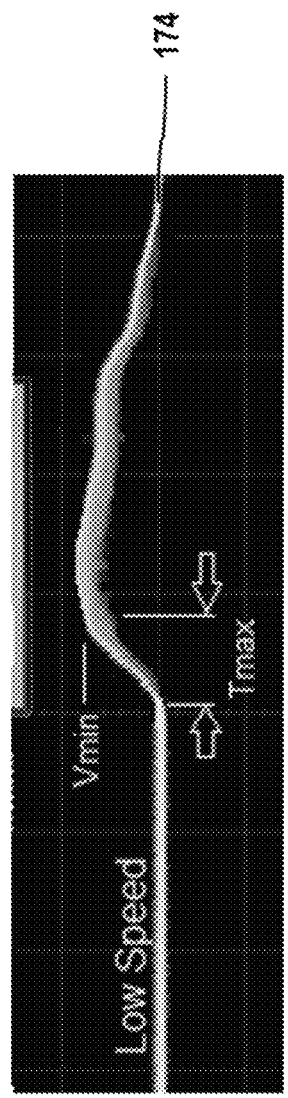
FIG. 14 illustrates a back EMF voltage over time signal, generated by a motor controlled with the FET switching control signals of FIG. 13.

As with the first algorithm, if no battery is connected to the wire harness connected to the ECU 30, 130, the ECU 30, 130 is not powered for the second algorithm. When an operator pushes the lift gate 21, the motor 22 generates a voltage (back-EMF). When the voltage is high enough, the software of the ECU 30, 130 starts to run. ECU 30, 130 measures the back-EMF voltage and the speed of the lift gate 21, for example, using the Hall-effect sensors 199. When the voltage generated by the motor 22 is higher than an electrical reference or threshold (e.g., 16 V), and the speed of the lift gate 21 is higher than a threshold (e.g. 45 degree per second), the ECU 30, 130 starts to turn on MOSFET (e.g. FETS 200₃, 200₄) with a first PWM duty ratio (e.g., 20%) to selectively short the motor terminals 24, 26 to ground 28 (e.g., 20% PWM duty means in every PWM period, within 20% duration motor terminals 24, 26 are connected to ground 28). For example, if the PWM period is 100 µs, then for every 100 µs, motor terminals 24, 26 are connected to ground 28 for 20 µs. If the voltage and speed of the motor 22 increases, the ECU 30, 130 increases the PWM duty ratio to a second PWM duty ratio (e.g., 50%), as a result, the motor 22 is shorted to ground 28 longer (i.e., in 50% time the motor 22 is shorted to ground 28). This can reduce the voltage generated by the motor 22 and speed of lift gate 21. Using this second closed-loop control algorithm, the ECU 30, 130 adjusts back-EMF voltage (and the speed of lift gate 21) within a safe range. FIG. 13 illustratively shows the two PWM switching strategies (e.g. signals) provided to motor terminals 24, 26 for shorting the terminals 24, 26 to ground to control the speed of the motor 22, and thus the lift gate 21.

If the operator moves the lift gate 21 at a normal speed (e.g. below 45 degrees per second), the ECU 30, 130 does not slow down the lift gate 21. If the operator slams the lift gate 21 too fast; the protection algorithm starts to kick in; the generated back EMF voltage 174 and the speed of the lift gate 21 starts to drop in response to the wake up of the ECU 30, 130, and the microprocessors 32 execution of the algorithms described above. Again, this second algorithm prevents the ECU 30, 130 connected to the battery wire harness from being damaged by the high back-EMF voltage. It also protects mechanical parts from being damaged by slam impact force by slowing down the lift gate 21.

Figure 15:
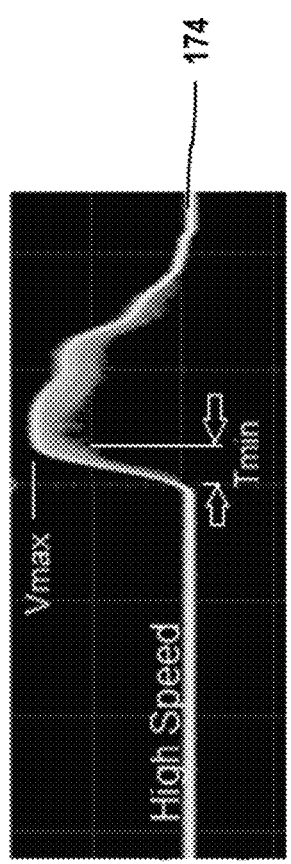
FIG. 15 illustrates a back EMF voltage over time signal, generated by a motor not controlled with the FET switching control signals of FIG. 13.
Figure 16:
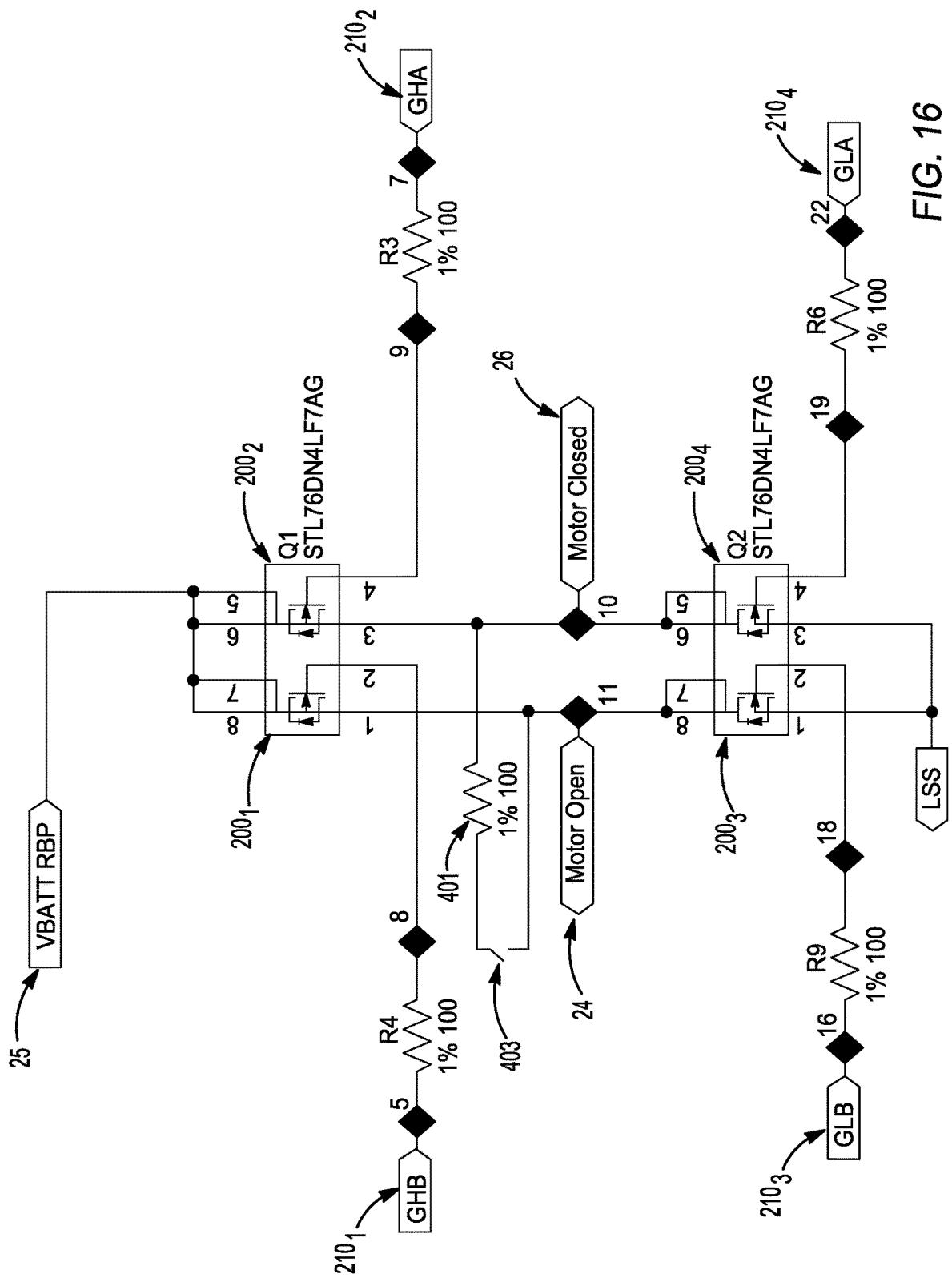
FIG. 16 illustrates a circuit diagram of a bidirectional motor control switching configuration having a selectable shunting resistor connected between motor terminals, in accordance with an illustrative embodiment.

As with the wake up provided by systems 34, 134, 234 described above, the first and second algorithms described can also be verified. For example, the battery 25 can be disconnected from the wire harness coupled to the ECU 30, 130. An oscilloscope may be used to measure the voltage on the battery wire harness. The lift gate 21 can be moved at a high speed and the algorithms can be verified with the software of ECU 30, 130 without these slam protection algorithms and the software of ECU 30, 130 with these slam protection algorithm. Several manual operation cycles (i.e., opening and closing lift gate 21) can be performed and the voltage on battery wire harness can be monitored and recorded. FIG. 15 illustrates a generated back EMF 174 without control of the lift gate 21 using the algorithms described herein to protect the ECU 30, 130. FIG. 16 illustrates a generated back EMF 174 with control of the lift gate 21 using the algorithms described herein to protect the ECU 30, 130.

The algorithms and use of the MOSFET to control motor 22 as described above can prevent ECU 30, 130 from being damaged by high back-EMF without adding any hardware components. Such algorithms also protect mechanical parts from being damaged by high velocity slam impact. Such algorithms could also be used, for example, with other power or motor operated components, such as, but not limited to a powered side power infinite check.

According to a further aspect, the ECU 30, 130 is configured to cause the motor 22 to apply a braking force opposing the manual movement of the controlled member. In this way, the system provides anti-theft functionality, which can detect a controlled member, such as a window, being manually opened, and can apply an opposite force to prevent the forceful entry into the vehicle 11. For example, the ECU 30, 130 may be configured to selectively short the power drive unit 12 to ground to cause the motor 22 to apply the braking force opposing the manual movement of the controlled member in response to the ECU 30, 130 being awoken using the systems and methods described hereinabove. As a result, a powerless security system for a vehicle can be provided, since the action of the unauthorized entry e.g. movement of the controlled member provides the system the requisite energy to initiate a controlled blocking of the controlled member in response to its movement.

According to a further aspect, the ECU 30, 130 is configured to cause the motor 22 to apply a braking force opposing the gravity based movement of the controlled member, such example as is the case of a physical brake, such as electromechanical brake assembly 38' fails in electromechanical strut 10', or if a brake for a garage door opener brake suspending a garage door in an open position fails. In this way, the system provides safety functionality, which can detect a controlled member, such as a lift gate, in freefall due to a failed brake for example, and can apply an opposite force to prevent or reduce the free fall of the controlled member. For example, the ECU 30, 130 may be configured to selectively short the power drive unit 12 to ground to cause the motor 22 to apply the braking force opposing the freefalling movement of the controlled member.

Now referring to FIG. 17, the ECU 30, 130 may be configured to selectively connect a resistive element to one or more motor terminals 24, 26 of the motor 22 to cause the motor 22 to apply the braking force opposing the manual movement of the controlled member. For example, the electronic control unit 30, 130 may be configured to selectively connect the resistive element 401 between the positive and negative motor terminals 24, 26, so the resistive element 401 dissipates electrical energy generated by the motor 22, thereby causing the motor 22 to apply the braking force opposing the manual or freefall movement of the controlled member. The ECU 30, 130 may be configured to operate a switch 403 selectively interconnecting the terminals 24, 26 through the resistive element 401 when it is determined that there is a manual movement or a freefall movement, for example by sensing the movement using the Hall sensors 199. A number of parallel resistive elements such as 400 may be switch between the terminals 24, 26 in a similar manner so as to vary the degree of braking force and energy dissipated. Alternatively or additionally, the ECU 30, 130 may be configured to selectively connect an electrical power supply to the motor 22 to apply the braking force opposing the manual movement of the controlled member.

According to a further aspect, the subject system may provide an alarm signal in response to the manual movement of the controlled member indicative of attempted theft or vandalism. Such an alarm signal may be used to trigger a warning such as an audible and/or visual alert, and/or may trigger an alert to a remote monitoring system, for example, through a wireless data connection. For example, either the comparator subsystem 36 or the ECU 30, 130 may be configured to generate the alarm signal in response to the manual movement of the controlled member. The comparator subsystem 36 or the ECU 30, 130 may be in electrical communication with a vehicle Body Control Module (BCM) 500 having security and/or alarm functionality, such as including a communication interface for communication over a communication network 501 to a remote device 502 such as security services server, such as the police, or the servers of a private security tracking company, or with a mobile device, such as the vehicle owner's cellular phone for receiving data information concerning the alarm event.

Figure 18:
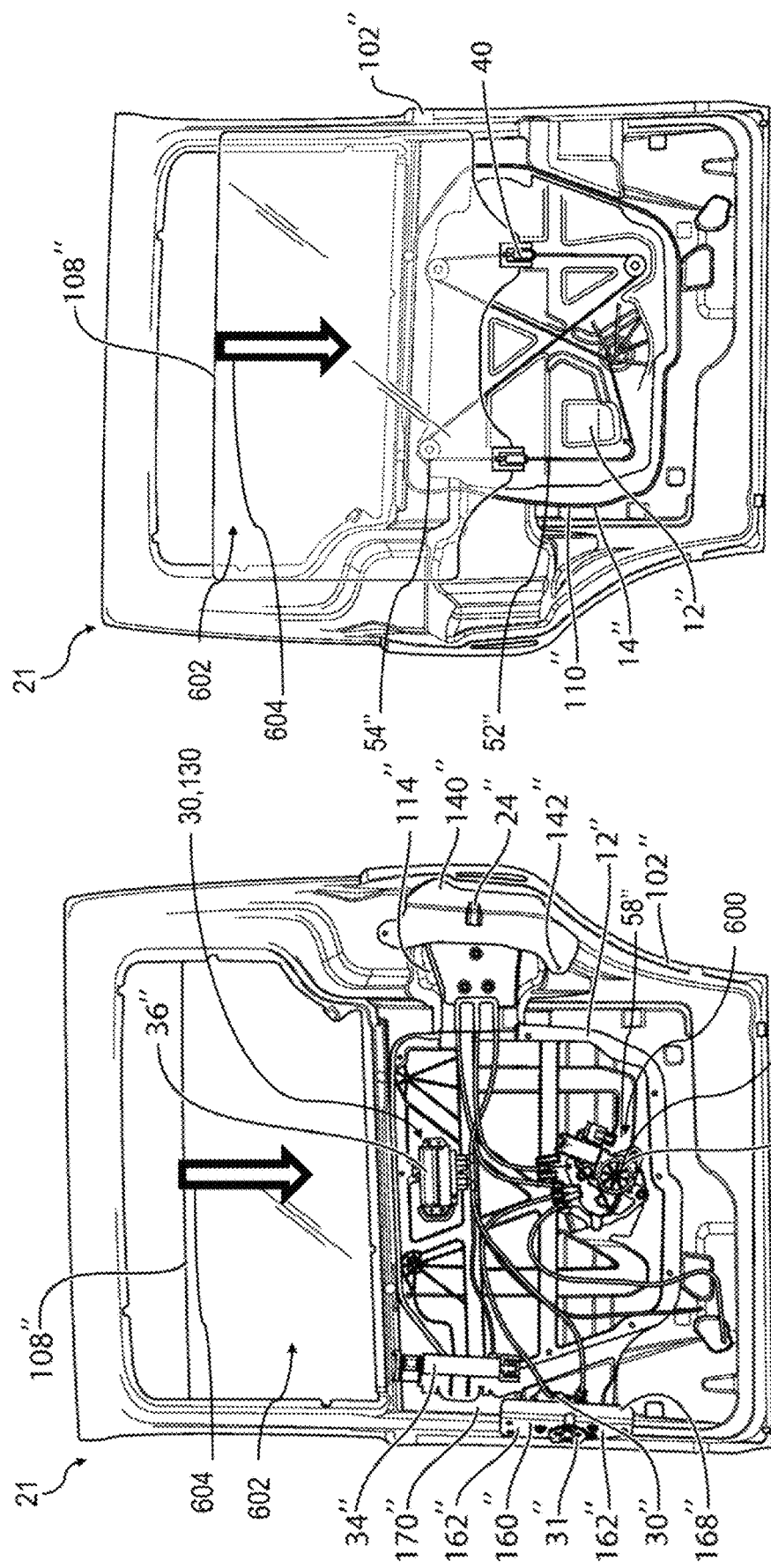
Figure 19:
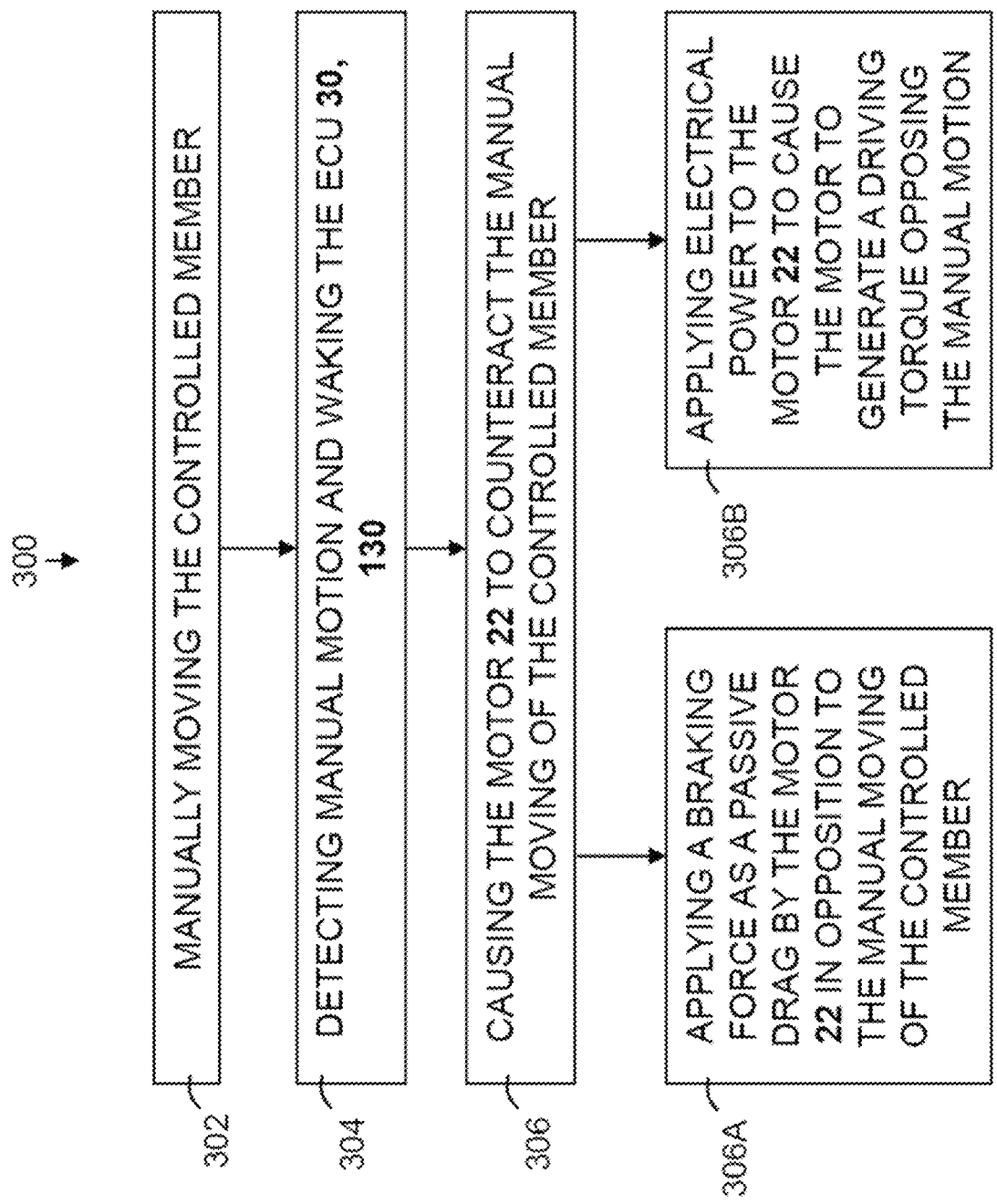

With reference now to FIGS. 18 and 19, there is illustrated an embodiment of a power drive unit 12 for a window regulator system, referred to as using reference numeral 600, which is controlled by electronic control unit 30, 130. A non-limiting example of such another type of conversion device is window regulator drive unit having a rotary wormgear 86 coupled to a motor output shaft 82 which is rotated in a controlled manner by motor 22, the worm gear 86 having threads being in meshed engagement with teeth provided on a gearset 84 coupled with motor 22 and which functions to provide a gear reduction function between the rotation of the output motor 82 shaft and a driven shaft 90 coupled to the gearset 84. The gearset 84 may employ additional or a different arrangement of components to provide for a reduction in speed between the output shaft 82 of the motor 22 and the driven shaft 90, which is, in turn coupled to move the controlled member. In this way, the gearset 84 may also provide a force multiplier, which can function to require a substantial force to be applied to the controlled member in order to manually move the controlled member. Such a force multiplier may have anti-theft applications, for example, in preventing persons from being able to easily manually move a controlled member such as a window 602 in a vehicle in order to gain entry into the vehicle due to the gearing relationship between the gearset 84 and the wormgear 86. However, providing such force multiplier relationship between the gearset 84 and the worm gear 86 which can make the motor 22 difficult or impossible to be back driven by the linear motion of the controlled member, can result in increased torque output and power consumption requirements placed on motor 22, optionally necessitating a larger sized motor 22, to move the closure member. It should be understood that the conversion device may take other forms and include cable drives and scissor mechanisms commonly used for door windows in vehicles.

An embodiment of power drive unit for a window regulator system 600 is disclosed in commonly owned U.S. Publication No. US 2017/0089115 A1, filed Sep. 6, 2016, entitled "BLDC Window Lift Motor System" and which is incorporated herein by reference in its entirety, referred to therein as power actuator unit 100, and which is reproduced in FIGS. 19A and 19B for convenience. The power drive unit for a window regulator system 600 illustratively includes the gearset 84 which can include a worm 86 mounted to an output shaft 82 of the motor 22 and a spur gear 88 meshed therewith to turn a driven shaft 90. The gearset 84 may employ additional or a different arrangement of components to provide for a reduction in speed between the output shaft 82 of the motor 22 and the driven shaft 90, which is, in turn coupled to move the controlled member, which in this illustrative example is window 602. In this way, the gearset 84 may also provide a force multiplier, which can function to require a substantial force to be applied to the window 602 in order to manually move the window 602 (i.e. upwardly or downwardly). Such a force multiplier may have anti-theft applications, for example, in preventing persons from being able to easily manually move the window 602, such as downwardly as shown by an arrow 604 in FIG. 19A, in order to gain entry into the vehicle 11. Power drive unit for a window regulator system 600 may be part of a cable drive system for moving a window 602 of the vehicle 11 as illustrated in FIG. 19A. For illustration and reference herein, the power drive unit for a window regulator system 600 or as referred to in U.S. Publication No. US 2017/0089115 A1 as window regulator motor 60" for window regulator 20", is reproduced in FIG. 19A and FIG. 19B for convenience with reference numbers referred to in U.S. Publication No. US 2017/0089115 A1 as being offset by a double prime (""") symbol. The electronic control unit 36" of U.S. Publication No. US 2017/0089115 A1 may integrate electronic control unit 30, 130 for controlling the window regulator motor 60" in a manner as will be described herein below. In operation of the window regulator motor 60" for controlling the movement of the window 108", 602, lift brackets 40" are driven along the rail tracks 42" by a cable drive system 50". The cable drive system 50" includes a wire or cable 52" which is connected to the lift brackets 40" and guided along a drive path by cable guides 54". The cable 52" is connected to a cable drive drum 56", as known in the art, which is mounted for rotation in a nesting mount 58" located on the wet side of the carrier 12". A bidirectional motor 60" is located on the dry side of the carrier 12" and connected to the cable drive drum 56'" via a shaft (e.g. driven shaft 90) which extends through a in the carrier 12" to the dry side to interconnect the cable drive drum 56"" and motor 60". The motor 60" is controlled by the ECU 36" which illustratively incorporates electronic control unit 30, 130 of the present disclosure. When the ECU 30 rotates the motor 60" in one directional sense, the cable drive drum 56" is also rotated to tension the cable 52" and the move the lift brackets 40" and window 108" in one direction, and conversely when the ECU 30 reverses the rotation of the motor 60" the lift brackets 40" and window 108" move in the opposite direction. Using the systems and methods described hereinabove, the ECU 30, 130 may be configured to selectively short window regulator motor 60" to ground to cause the window regulator motor 60″ to apply the braking force opposing the manual movement of the window 602 in response to the ECU 30, 130 being awoken by an attempted unauthorized entry by a would be thief. As a result, a powerless security system for the vehicle can be provided, since the action of the unauthorized entry e.g. movement of the window 602 provides the system the requisite energy to initiate a controlled blocking of the window 602 in response to its movement.

Furthermore, the system for waking an ECU 30, 130 upon movement of a controlled member of the present disclosure, may allow for a gearset 84 and/or other hardware that does not need to mechanically oppose manual movement of the controlled member to the extent previously required. In other words, where prior art systems required complex and/or substantial hardware solutions to preventing manual movement of controlled members, such as windows and garage doors, to prevent them from being manually manipulated to gain entry into the vehicle 11. The subject system can provide similar anti-theft/access prevention functionality using existing hardware, such as the motor 22, with a simplified gearset 84, providing potential savings in weight and/or cost.

A method 300 is provided illustrating an anti-theft aspect of the subject system in the flow chart of FIG. 20. The method 300 includes manually moving the controlled member at step 302. This may include, for example, a pulling, pushing, wedging, or other force being applied to a controlled member, such as a window, door panel, sun roof, or other closure, for example a garage door. Controlled members such as windows that are left partially open can be especially vulnerable to being manually forced open by a would-be thief. Vehicle operators may leave one or more windows or other closures partially open inadvertently or intentionally, for example, to provide cooling airflow into a vehicle left in hot conditions.

The method 300 includes detecting manual motion of the closure member and waking the ECU 30, 130 at step 304. This step may be performed in accordance with the present disclosure, using a comparator subsystem 36, 136 to compare the electrical output from a motor 22 within a power drive unit 12 to an electrical reference, and waking the ECU 30, 130 from its sleep or non-powered mode into its operational mode based on the comparison of the electrical output of the power drive unit 12 to the electrical reference.

The method 300 also includes causing the motor 22 to counteract the manual moving of the controlled member at step 306. This step 306 can be performed by applying a braking force as a passive drag by the motor 22 in opposition to the manual moving of the controlled member at sub-step 306A. For example, the ECU 30, 130 may cause one or more of the motor terminals 24, 26 to be connected to the vehicle ground 28 or to a resistive load, such as resistive element 401, such as a resistor. Alternatively, 306 can be performed by applying electrical power to the motor 22 to cause the motor to generate a driving torque opposing the manual moving of the controlled member at sub-step 306B. For example, the ECU 30, 130 may supply the electrical power to the motor 22 to counter the manual motion of the controlled member.

Clearly, changes may be made to what is described and illustrated herein without, however, departing from the scope defined in the accompanying claims. The system disclosed herein may instead be used for other actuators or motor operated systems within the motor vehicle or for different applications, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The elements and assemblies disclosed herein may be otherwise oriented (rotated degrees or at other orientations) and the spatially relative descriptions used herein interpreted accordingly.

What is claimed is:

1. A system for waking an electronic control unit upon movement of a controlled member, comprising:
   a power drive unit including a motor coupled to the controlled member and in electrical communication with the electronic control unit for moving the controlled member and producing an electrical output by a back electromotive force in said motor in response to a manual movement of the controlled member;
   wherein the electronic control unit is operable in an operational mode or in a sleep mode, and wherein the electronic control unit is configured to cause said motor to apply a braking force opposing the manual movement of the controlled member;
   a comparator subsystem coupled to said power drive unit and configured to:
   compare the electrical output to an electrical reference, and
   wake the electronic control unit from the sleep mode into the operational mode based on the comparison of the electrical output of said power drive unit to the electrical reference.

2. The system for waking an electronic control unit upon movement of a controlled member of claim 1, wherein said comparator subsystem is further configured to dissipate the back electromotive force based on the comparison of the electrical output of said power drive unit to the electrical reference.

3. The system for waking an electronic control unit upon movement of a controlled member of claim 1, wherein the controlled member is a lift gate of a vehicle.

4. The system for waking an electronic control unit upon movement of a controlled member of claim 1, wherein the controlled member is a sliding closure of a vehicle.

5. The system for waking an electronic control unit upon movement of a controlled member of claim 1, wherein the controlled member is a window of a vehicle.

6. The system for waking an electronic control unit upon movement of a controlled member of claim 1, wherein said comparator subsystem includes a differential amplifier to compare the electrical output to the electrical reference.

7. The system for waking an electronic control unit upon movement of a controlled member of claim 6, wherein the electrical reference is a predetermined voltage.

8. The system for waking an electronic control unit upon movement of a controlled member of claim 1, wherein the electronic control unit is configured to measure a speed of the controlled member.

9. The system for waking an electronic control unit upon movement of a controlled member of claim 1, wherein the electronic control unit is configured to measure a speed of the controlled member; and
   wherein the braking force is proportionate to the speed of the controlled member.

10. The system for waking an electronic control unit upon movement of a controlled member of claim 9, wherein the electronic control unit is configured to vary the amount of the braking force using pulse width modulation.

11. The system for waking an electronic control unit upon movement of a controlled member of claim 1, wherein the electronic control unit is configured to selectively short said power drive unit to ground to cause said motor to apply the braking force opposing the manual movement of the controlled member.

12. The system for waking an electronic control unit upon movement of a controlled member of claim 1, wherein the electronic control unit is configured to selectively connect a resistive element to one or more motor terminals of said motor to cause said motor to apply the braking force opposing the manual movement of the controlled member.

13. The system for waking an electronic control unit upon movement of a controlled member of claim 12, wherein the electronic control unit is configured to selectively connect the resistive element between two or more of the one or more motor terminals of said motor to cause said motor to apply the braking force opposing the manual movement of the controlled member.

14. The system for waking an electronic control unit upon movement of a controlled member of claim 1, wherein the electronic control unit is configured to selectively connect an electrical power supply to said motor to apply the braking force opposing the manual movement of the controlled member.

15. The system for waking an electronic control unit upon movement of a controlled member of claim 1, wherein said power drive unit includes a gearset configured to provide a speed reduction between an output shaft of said motor and a driven shaft coupled to move the controlled member.

16. The system for waking an electronic control unit upon movement of a controlled member of claim 1, wherein one of said comparator subsystem or said electronic control unit is configured to generate an alarm signal in response to the manual movement of the controlled member.

17. A system for protecting an electronic control unit from back electromotive force comprising:
   a power drive unit coupled to a controlled member and to said electronic control unit for moving the controlled member;
   wherein the electronic control unit is operable in an operational mode or in a sleep mode; and
   said electronic control unit adapted to:
   wake up from the sleep mode into the operational mode using an electrical output of said power drive unit generated in response to a manual movement of the controlled member,
   dissipate the electrical output of the power drive unit in response to the manual movement of the controlled member, and
   cause a motor of the power drive unit to apply a braking force opposing the manual movement of the controlled member.

18. A method for operating an electronic control unit, comprising:
- waking the electronic control unit from a sleep mode into an operational mode using an electrical output of a power drive unit in response to a manual movement of a controlled member coupled to the power drive unit;
- detecting the manual movement of the controlled member; and
- causing a motor of the electronic control unit to apply a braking force opposing the manual movement of the controlled member in response to detecting the manual movement of the controlled member.

19. The method of claim 18, wherein causing the motor of the electronic control unit to apply the braking force further comprises causing the motor to apply a passive drag opposing the manual movement of the controlled member.

20. The method of claim 18, wherein causing the motor of the electronic control unit to apply the braking force further comprises causing the motor to apply a driving torque opposing the manual movement of the controlled member.

* * * * *